US012811885B1

(12) United States Patent
Tewari et al.

(10) Patent No.: US 12,811,885 B1
(45) Date of Patent: Nov. 24, 2026

(54) TUNNEL LOAD-AWARE LOAD BALANCER

(71) Applicant: Netskope, Inc., Santa Clara, CA (US)

(72) Inventors: Varun Tewari, Sunnyvale, CA (US); Ankit Kumar Sinha, Bangalore (IN); Kartik Subbanna, Bangalore (IN)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 19/466,159

(22) Filed: Jan. 30, 2026

(51) Int. Cl.
*H04L 47/125* (2022.01)
*H04L 12/46* (2006.01)
*H04L 47/2425* (2022.01)

(52) U.S. Cl.
CPC ........ *H04L 47/125* (2013.01); *H04L 12/4633* (2013.01); *H04L 47/2433* (2013.01)

(58) Field of Classification Search
CPC ............... H04L 47/125; H04L 12/4633; H04L 47/2433; H04L 45/02; H04L 41/20; H04L 45/64
See application file for complete search history.

(56) References Cited

U.S. PATENT DOCUMENTS 7,272,653 B2 9/2007 Levy-Abegnoli et al.
7,738,452 B1 6/2010 O'Rourke et al.
11,856,041 B2 12/2023 Muniyappa et al.
11,863,428 B2 1/2024 Ramaswamy
2004/0100953 A1* 5/2004 Chen .................. H04L 12/4633 370/252
2005/0022203 A1 1/2005 Zisapel et al.
2006/0064478 A1 3/2006 Sirkin
(Continued)

FOREIGN PATENT DOCUMENTS

CN 1754374 A 3/2006
CN 101686172 A 3/2010
(Continued)

OTHER PUBLICATIONS

Jan, Mian Ahmad et al., "An AI-enabled lightweight data fusion and load optimization approach for Internet of Things," Future Generation Computer Systems, 2021, vol. 122, pp. 40-51.
(Continued)

*Primary Examiner* — Ian N Moore
*Assistant Examiner* — Latresa A McCallum
(74) *Attorney, Agent, or Firm* — MUGHAL GAUDRY & FRANKLIN PC

(57) ABSTRACT

A load-aware balancing system for distributing ingress tunnel traffic based on tunnel load. Ingress tunnel traffic of overlay tunnels is received by gateway nodes. A load balancer included in a mid-link server extracts a plurality of key performance indicators associated with the overlay tunnels. Tunnel load and node load for each overlay tunnel are determined by the load balancer. A status associated with each overlay tunnel for forwarding the overlay tunnels to a gateway node is determined by the load balancer. The overlay tunnels for forwarding to the gateway node are identified by the load balancer. A dynamic routing indicator for each gateway node is determined by the load balancer. The gateway node for forwarding the overlay tunnels is selected by the load balancer. The ingress tunnel traffic of the overlay tunnels is routed to the selected gateway node. The dynamic routing indicator is regularly updated by the load balancer.

20 Claims, 12 Drawing Sheets

(56) References Cited

U.S. PATENT DOCUMENTS

| | | | | |
|---|---|---|---|---|
| 2019/0207844 | A1* | 7/2019 | Kodavanty | H04L 12/4633 |
| 2020/0195557 | A1* | 6/2020 | Duan | H04L 12/4645 |
| 2021/0385155 | A1* | 12/2021 | Suryanarayana | H04L 45/02 |

FOREIGN PATENT DOCUMENTS

| | | | |
|---|---|---|---|
| CN | 102450052 | A | 5/2012 |
| CN | 104579998 | A | 4/2015 |
| CN | 110753002 | A | 2/2020 |
| CN | 113872875 | A | 12/2021 |
| CN | 114745332 | A | 7/2022 |
| CN | 116547956 | A | 8/2023 |
| DE | 19531609 | A1 | 3/1996 |
| DE | 112019005826 | T5 | 8/2021 |
| DE | 102024100136 | A1 | 10/2024 |
| KR | 20040100179 | A | 12/2004 |
| WO | 2014029287 | A1 | 2/2014 |

OTHER PUBLICATIONS

Olatunde-Thorpe, J. et al., "Integrating load Balancing Strategies: Conceptual Frameworks Ensuring Optimized Performance Across Enterprise and Service Provider Networks," Journal of Frontiers in Multidisciplinary Research, Jul.-Dec. 2022, vol. 3, Issue 2, pp. 170-181.

Petrovic, T. et al., "An Adaptive Application-Aware Dynamic Load Balancing Framework for Open-Source SD-WAN," Sensors, 2025, 25, 5516, pp. 1-23.

* cited by examiner

TUNNEL LOAD-AWARE LOAD BALANCER

BACKGROUND

This disclosure relates in general to network traffic management and, not by way of limitation, to dynamic load balancing for ingress tunnel traffic across distributed computing infrastructures, among other things.

Modern distributed systems increasingly operate under highly dynamic and unpredictable workloads. Traditional load balancing techniques, which rely on static configurations or limited metrics, struggle to adapt to fluctuating traffic patterns, varying server capacity, and real-time network conditions. As cloud-native and distributed architectures evolve, these limitations lead to bottlenecks, latency issues, and inefficient resource utilization.

Moreover, systems for implementing load-aware and context-driven load balancing can regularly assess real-time performance indicators and dynamically adapt traffic distribution across servers and network tunnels.

SUMMARY

In one embodiment, the present disclosure provides a load-aware balancing system for distributing ingress tunnel traffic based on tunnel load. Ingress tunnel traffic of overlay tunnels is received by gateway nodes. A load balancer included in a mid-link server extracts a plurality of key performance indicators associated with the overlay tunnels. Tunnel load and node load for each overlay tunnel are determined by the load balancer. A status associated with each overlay tunnel for forwarding the overlay tunnels to a gateway node is determined by the load balancer. The overlay tunnels for forwarding to the gateway node are identified by the load balancer. A dynamic routing indicator for each gateway node is determined by the load balancer. The gateway node for forwarding the overlay tunnels is selected by the load balancer. The ingress tunnel traffic of the overlay tunnels is routed to the selected gateway node. The dynamic routing indicator is regularly updated by the load balancer.

In an embodiment, a load-aware balancing system for distributing ingress tunnel traffic based on tunnel load. The load-aware balancing system comprises one or more gateway nodes configured to receive the ingress tunnel traffic of a plurality of overlay tunnels. The plurality of overlay tunnels terminate at the one or more gateway nodes. Further, the load-aware balancing system comprises a mid-link server operatively coupled to the one or more gateway nodes. The mid-link server includes a load balancer configured to extract from the one or more gateway nodes, a plurality of key performance indicators (KPIs) associated with the plurality of overlay tunnels. The load balancer is configured to determine the tunnel load for each overlay tunnel based on the plurality of KPIs. The load balancer is further configured to determine a node load for each gateway node of the one or more gateway nodes based on tunnel loads of overlay tunnels terminating at a corresponding gateway node. The load balancer is further configured to determine a status associated with each overlay tunnel of the plurality of overlay tunnels for forwarding one or more overlay tunnels to a gateway node. Based on the status of the one or more overlay tunnels, the load balancer is configured to identify the one or more overlay tunnels for forwarding to the gateway node. The load balancer is further configured to determine, based on the node load, the tunnel load, and the plurality of KPIs, a dynamic routing indicator for each of the one or more gateway nodes. The load balancer is further configured to select the gateway node from the one or more gateway nodes for forwarding the one or more overlay tunnels based on the dynamic routing indicator. Further, the load balancer is configured to route the ingress tunnel traffic of the one or more overlay tunnels to the selected gateway node. Thereafter, the load balancer is configured to regularly update the dynamic routing indicator based on a change in at least one of the plurality of KPIs, wherein subsequent ingress tunnel traffic associated with the plurality of overlay tunnels is routed according to the updated dynamic routing indicator.

In another embodiment, a load balancing method for distributing ingress tunnel traffic based on tunnel load. The method comprises receiving the ingress tunnel traffic of a plurality of overlay tunnels from the one or more gateway nodes. The plurality of overlay tunnels terminates at the one or more gateway nodes. The method further comprises extracting from the one or more gateway nodes, a plurality of key performance indicators (KPIs) associated with the plurality of overlay tunnels. The method further comprises determining the tunnel load for each overlay tunnel based on the plurality of KPIs. The method further comprises determining a node load for each gateway node of the one or more gateway nodes based on tunnel loads of overlay tunnels terminating at a corresponding gateway node. The method further comprises determining a status associated with each overlay tunnel of the plurality of overlay tunnels for forwarding one or more overlay tunnels to a gateway node. Further, the method comprises identifying, via the one or more overlay tunnels for forwarding to the gateway node based on the status of the one or more overlay tunnels. The method further comprises determining based on the node load, the tunnel load and the plurality of KPIs, a dynamic routing indicator for each of the one or more gateway nodes. The method further comprises selecting the gateway node from the one or more gateway nodes for forwarding the one or more overlay tunnels based on the dynamic routing indicator. Further, the method comprises routing the ingress tunnel traffic of the one or more overlay tunnels to the selected gateway node. Thereafter, the method comprises regularly updating the dynamic routing indicator based on a change in at least one of the plurality of KPIs, wherein subsequent ingress tunnel traffic associated with the plurality of overlay tunnels is routed according to the updated dynamic routing indicator.

In yet another embodiment, a non-transitory computer-readable storage medium having stored thereon instructions for causing at least one processor to execute a method for distributing ingress tunnel traffic based on tunnel load, the instructions including:

receiving the ingress tunnel traffic of a plurality of overlay tunnels, wherein the plurality of overlay tunnels terminate at the one or more gateway nodes;

extracting from the one or more gateway nodes, a plurality of key performance indicators (KPIs) associated with the plurality of overlay tunnels;

determining the tunnel load for each overlay tunnel based on the plurality of KPIs;

determining a node load for each gateway node of the one or more gateway nodes based on tunnel loads of overlay tunnels terminating at a corresponding gateway node;

determining a status associated with each overlay tunnel of the plurality of overlay tunnels for forwarding one or more overlay tunnels to a gateway node;

identifying the one or more overlay tunnels for forwarding to the gateway node based on the status of the one or more overlay tunnels;

determining based on the node load, the tunnel load and the plurality of KPIs, a dynamic routing indicator for each of the one or more gateway nodes;

selecting the gateway node from the one or more gateway nodes for forwarding the one or more overlay tunnels based on the dynamic routing indicator;

routing the ingress tunnel traffic of the one or more overlay tunnels to the selected gateway node; and regularly updating the dynamic routing indicator based on a change in at least one of the plurality of KPIs, wherein subsequent ingress tunnel traffic associated with the plurality of overlay tunnels is routed according to the updated dynamic routing indicator.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the same reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

Figure 1:
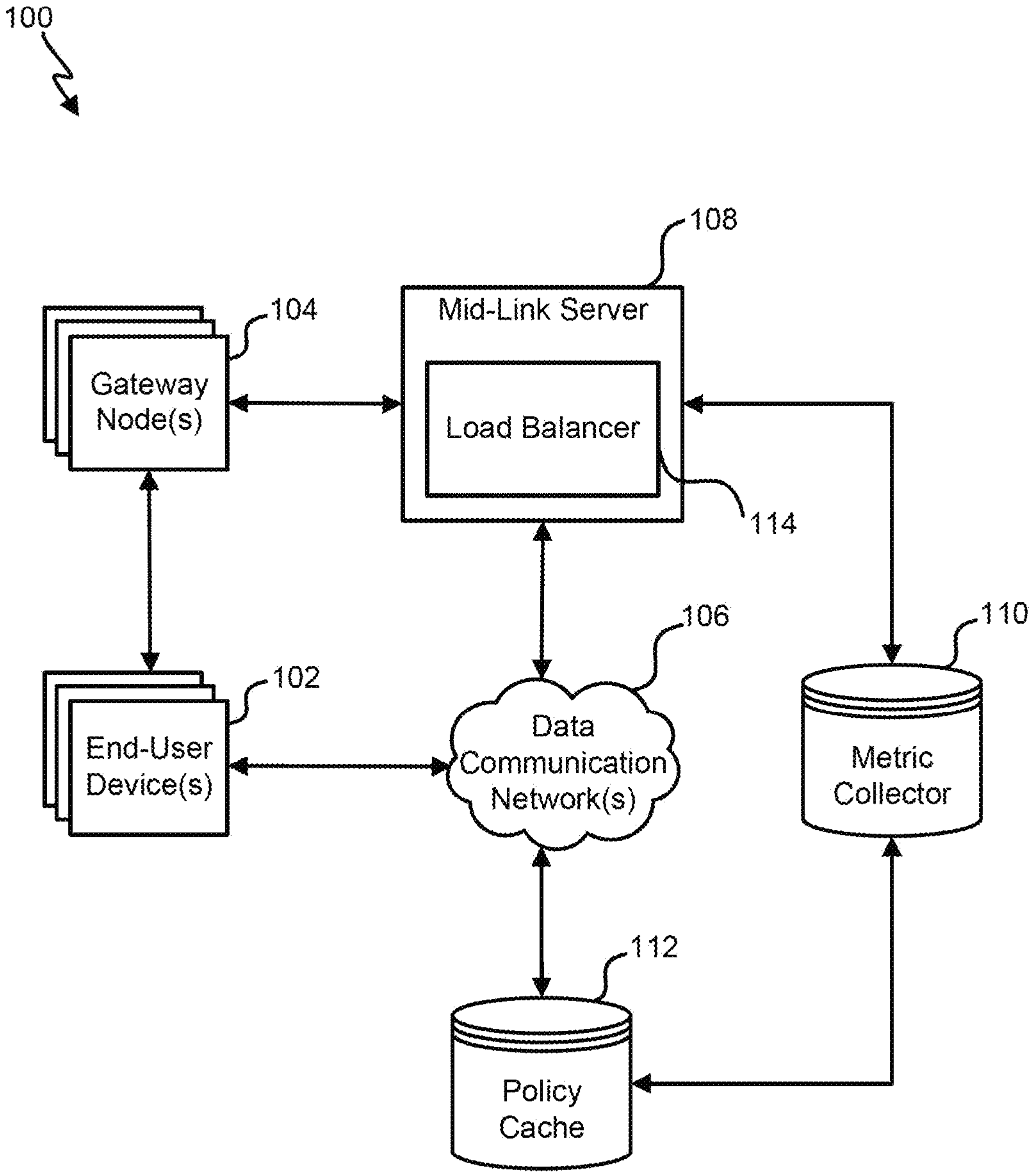
FIG. 1 illustrates a block diagram of a load-aware balancing system for distributing ingress tunnel traffic based on tunnel load.

Referring to FIG. 1, a block diagram of a load-aware balancing system 100 is illustrated. The load-aware balancing system 100 is configured to distribute ingress tunnel traffic initiated from end-user device(s) 102 of an end-user (not shown) to gateway nodes 104 via a plurality of overlay tunnels. The load-aware balancing system 100 includes the end-user device(s) 102, the gateway nodes 104, data communication network(s) 106, a mid-link server 108, a metric collector 110, and a policy cache 112. The end-user device(s) 102, the mid-link server 108, the metric collector 110, and the policy cache 112 are connected by the data communication network(s) 106.

The end-user accesses one or more applications or services through the end-user device(s) 102 and generates the ingress tunnel traffic. The generated ingress tunnel traffic is transmitted through an overlay tunnel to the gateway nodes 104. The ingress tunnel traffic is received at the gateway nodes 104. The overlay tunnels correspond to long-standing network overlay tunnels. The overlay tunnels terminate at gateway nodes 104, and the gateway nodes 104 forward the received ingress tunnel traffic to the data communication network(s) 106. The overlay tunnels comprise, but are not limited to, Internet Protocol Security (IPSec) tunnels, Generic Routing Encapsulation (GRE) tunnels, Datagram Transport Layer Security (DTLS) tunnels, WireGuard tunnels, Secure Sockets Tunneling Protocol (SSTP) tunnels, Secure Sockets Layer (SSL), Transport Layer Security (TLS) tunnel, or other tunnel types. The tunnel can be secured or unsecured, including an encrypted tunnel or an unencrypted tunnel.

The overlay tunnels are associated with telemetry data. Telemetry data includes a plurality of key performance indicators (KPIs). The plurality of KPIs includes at least one of bandwidth utilization, packets per second (PPS), latency, jitter, packet loss, and server resource utilization. Further, the plurality of KPIs is indicative of real-time network conditions. The bandwidth utilization indicates a proportion of available link capacity consumed by the ingress tunnel traffic transmitted and received on the overlay tunnels. The PPS corresponds to a rate at which the ingress tunnel traffic is forwarded through the overlay tunnels in real-time. The latency corresponds to the time taken for the ingress tunnel traffic to travel from a source gateway node to a destination gateway node across the overlay tunnel. The jitter corresponds to variation in latency between successive packets associated with the ingress tunnel traffic. The packet loss corresponds to the percentage of the packets associated with the ingress tunnel traffic within the plurality of overlay tunnels that fail to reach the gateway nodes 104. The server resource utilization indicates consumption of computing resources such as Central Processing Unit (CPU), memory, or disk of gateway nodes 104.

The plurality of KPIs is collected and analyzed by the mid-link server 108. The plurality of KPIs evaluates the performance of the plurality of overlay tunnels terminating at the gateway nodes 104 and dynamically determines a routing decision for distributing the ingress tunnel traffic across the gateway nodes 104. The mid-link server 108 is operatively coupled to the gateway nodes 104. The mid-link server 108 includes a load balancer 114.

The load balancer 114 monitors the plurality of KPIs associated with the overlay tunnels terminating at a gateway node 104. The load balancer 114 further extracts from the gateway nodes 104, the plurality of KPIs associated with the plurality of overlay tunnels. The load balancer 114 further determines a tunnel load overlay tunnel(s) based on the plurality of KPIs. The tunnel load is determined as a weighted combination of one or more of the bandwidth utilization, the PPS, the latency, the jitter, and the packet loss. KPI(s) can be normalized to a predefined top value.

Further, the load balancer 114 determines a node load for gateway nodes 104 based on tunnel loads of overlay tunnels terminating at gateway node 104. Further, the load balancer 114 determines a status associated overlay tunnels for forwarding one or more overlay tunnels to the gateway node 104. The status associated with the overlay tunnel is that the overlay tunnel is an incoming new overlay tunnel, or an overloaded tunnel. The overloaded tunnel is an existing overlay tunnel experiencing degradation.

In some embodiments, the load balancer 114 employs a horizontally scalable gateway architecture in which gateway nodes 104 operates as peers. When the new overlay tunnel is created, the load balancer 114 estimates an expected tunnel load and assigns the new overlay tunnel to the gateway node 104 that is best capable of handling the tunnel load. Horizontal scaling approach maintains an even distribution of the tunnel load across gateway nodes 104, prevents overloading of any single gateway node 104, and enables the load balancer 114 to dynamically add additional gateway nodes 104 into the load-aware balancing system 100 as capacity demands increase.

The load balancer 114 further identifies one or more overlay tunnels for forwarding to the gateway node 104 based on the status of the one or more overlay tunnels. Further, the load balancer 114 determines a dynamic routing indicator for gateway nodes 104 based on the node load, the tunnel load, and the plurality of KPIs. The dynamic routing indicator corresponds to a computed routing value determined based on the tunnel load, the node load and the plurality of KPIs. Further, the dynamic routing indicator is updated based on the status associated with the overlay tunnels. The updated dynamic routing indicator is used to select the gateway node 104 for forwarding the new overlay tunnel, or the overloaded tunnel to the selected gateway node 104.

The load balancer 114 further selects the gateway node from the gateway nodes 104 for forwarding the one or more overlay tunnels based on the dynamic routing indicator. Further, the load balancer 114 routes the ingress tunnel traffic of the one or more overlay tunnels to the selected gateway node. The load balancer 114 regularly updates the dynamic routing indicator based on a change in at least one of the plurality of KPIs, such that the subsequent ingress tunnel traffic associated with the plurality of overlay tunnels is routed according to the updated dynamic routing indicator.

The load balancer 114 prioritizes high-priority tunnels by applying a priority weighting factor to the tunnel load of a high-priority tunnel. The high-priority tunnels correspond to premium tunnels. The high-priority tunnels include tunnels with dedicated nodes, and Service Level Agreement (SLA) requirements. The tunnel load of the high-priority tunnel includes an additional parameter in the priority weighting factor for the determination of the tunnel load.

A policy from a set of predefined policies is applied by the mid-link server 108 based on information stored in the metric collector 110 and the policy cache 112. The stored information includes the plurality of KPIs. In some embodiments, the mid-link server 108 maintains the metric collector 110 to store the plurality of KPIs in accordance with the set of predefined policies. In some embodiments, mid-link server 108 maintains an updated set of predefined policies by regularly syncing with external repositories (not shown) and applying changes to the metric collector 110.

The metric collector 110 stores the plurality of KPIs in a database (not shown). The database is communicatively coupled to the metric collector 110. In some embodiments, the metric collector 110 supports indexed or time-series storage to enable efficient retrieval of real-time and historical performance metrics for use in the dynamic load distribution decisions. The performance metrics correspond to the plurality of KPIs. The mid-link server 108 periodically synchronizes with the metric collector 110. The metric collector 110 applies the set of predefined policies on the plurality of KPIs stored in the database based on an analysis of the load balancer 114 and a storage capacity of the database.

The gateway nodes 104 regularly provide the real-time KPIs to the metric collector 110 that stores the real-time KPIs in the database. The load balancer 114 dynamically updates the tunnel load based on the real-time KPIs. Further, the load balancer 114 dynamically updates the node load based on the updated tunnel load. Further, the load balancer 114 dynamically updates the dynamic routing indicator based on the updated node load and the updated tunnel load.

The policy cache 112 stores the set of predefined policies. The set of predefined policies further includes load-management and telemetry-handling policies used by the mid-link server 108 for processing the plurality of KPIs associated with each overlay tunnel and executing the dynamic load distribution decisions. The set of predefined policies includes rules for the KPIs storage intervals, the aggregation rules, and the retention durations. The aggregation rules define a manner in which the KPIs are combined over a selected time window. The retention durations define a time duration for which the stored KPIs are preserved before being purged from the load-aware balancing system 100. The policy cache 112 is periodically updated based on updates applied to the metric collector 110. By maintaining an updated set of policies locally, the mid-link server 108 can perform real-time routing operations with low latency.

Figure 2:
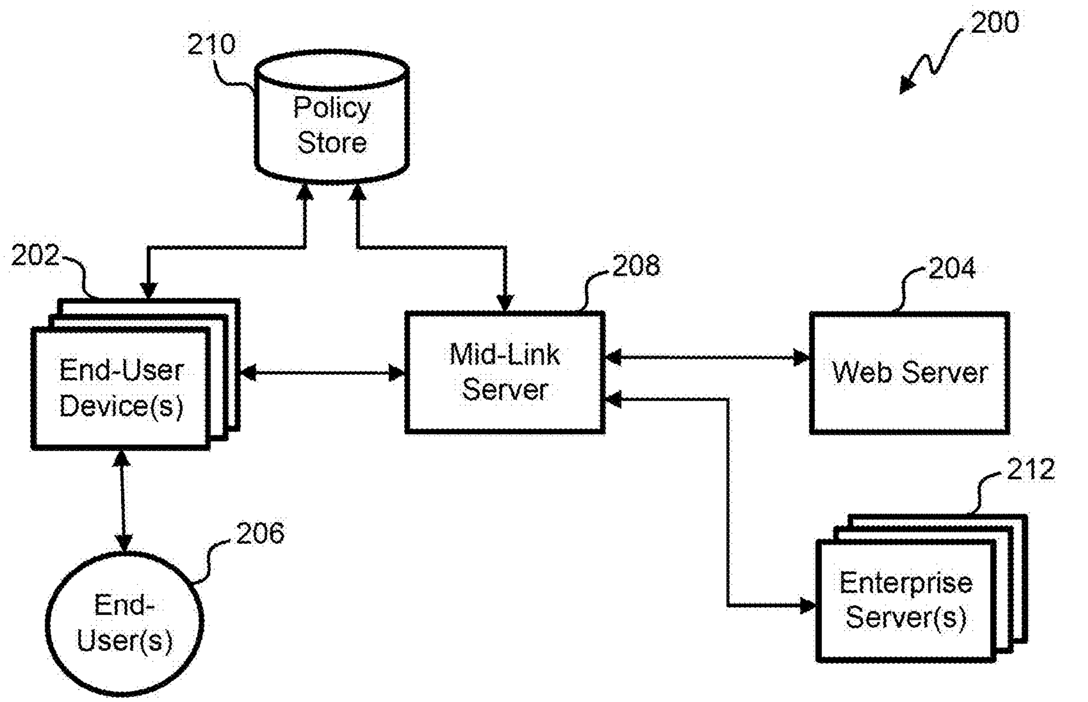
FIG. 2 illustrates a block diagram showing interaction between one or more components of a load-aware balancing system.

Referring to FIG. 2, a block diagram illustrating an interaction between one or more components of a load-aware balancing system 200 is shown. The load-aware balancing system 200 includes end-user device(s) 202, a web server 204, end-user(s) 206, a mid-link server 208, a policy store 210, and enterprise server(s) 212. The end-user device(s) 202, such as smartphones, tablets, PCs, and other computing devices, communicate with the web server 204 via encrypted internet links. The end-user device(s) 202 may be secured by using the mid-link server 208, which remotely hosts a secure software environment. The end-user device(s) 202 run any popular operating system (OS) such as Windows™, iOS™, Android™, Linux, set-top box OSes such as Real-Time Operating System (RTOS), Unix OS, Linux-Kernel, and Linux OS on the Internet of Things (IoT)/Industrial control systems (ICS)/Distributed Control Systems (DCS)/Operational Technology (OT), and Chromebook™. The operating system of the end-user device(s) 202 runs third-party apps. The policy store 210 (or a policy component) holds the set of predefined policies for the end-user device(s) 202 and the mid-link server 208.

In some embodiments, the mid-link server 208 acts as an intelligent traffic management and policy enforcement layer between the gateway nodes 104 and the one or more applications or services accessed by the end-user device(s) 202 from the web server 204. The mid-link server 108 monitors the plurality of KPIs extracted from the gateway nodes 104 to identify variations in the tunnel load, the node load, and the KPIs across the overlay tunnels. The plurality of KPIs shows real-time traffic characteristics of the ingress tunnel traffic associated with the overlay tunnels. The mid-link server 208 applies a policy from the set of predefined policies stored in the policy cache 112 to determine the tunnel load for overlay tunnels.

Mid-link server 208 further applies a policy from the set of predefined policies stored in the policy cache 112 to determine the node load for gateway nodes 104 based on the tunnel loads of the overlay tunnels terminating at the respective gateway node 104. Mid-link server 208 further applies a policy from the set of predefined policies stored in the policy cache 112 to determine the dynamic routing indicator for gateway nodes 104. The set of predefined policies further includes enterprise-defined load management policies.

The web server 204 includes applications, services, or backend systems that are accessed by end-user device(s) 202 through the plurality of overlay tunnels. The web server 204 serves as destination endpoints for the ingress tunnel traffic received and processed by the gateway nodes 104 and the mid-link server 208. In some embodiments, the web server 204 hosts business-critical workloads, Application Programming Interfaces (APIs), or service endpoints that rely on stable and balanced network performance. The web server 204 communicates with the end-user device(s) 202 via the mid-link server 208 over the data communication network(s) 106. In some embodiments, the web server 204 handles incoming hypertext transfer protocol (HTTP) and hypertext transfer protocol secure (HTTPS) requests originating from the end-user device(s) 202 of the end-user(s) 206.

Policy store 210 is a centralized repository that stores and maintains the set of predefined policies used by the mid-link server 208 to govern the selection of the gateway node 104 for forwarding the one or more overlay tunnels, load distribution, and routing decisions across the gateway nodes 104. The set of predefined policies includes at least one of rules, threshold, and configuration policies defined by an administrator for the tunnel load determination, the node load determination, and the dynamic routing indicator determination.

In some embodiments, the policy store 210 also stores predefined enterprise-level policies including KPI weighting profiles, overlay tunnel admission criteria, the dynamic routing indicator, failover rules, and quality-of-service (QoS) constraints. The KPI weighting profiles correspond to policy-defined weight assignments that determine the relative importance of KPIs during routing and load-balancing computations. The tunnel admission criteria indicate policy rules that govern whether a new overlay tunnel is allowed, delayed, or denied based on current system conditions. The routing indicators indicate predefined utilization limits beyond which the load-aware balancing system 100 triggers congestion mitigation or rerouting mechanisms. The failover rules indicate policy-defined procedures for redirecting the overlay tunnel when a gateway node 104 becomes unavailable. The QoS constraints indicate service-level demands, such as low bandwidth or high latency, that must be satisfied during traffic distribution.

The stored set of predetermined policies defines a way the plurality of KPIs, such as the bandwidth utilization, the PPS, the latency, the jitter, the packet loss, and the server resource availability, is interpreted when determining the tunnel load, the node load, and the status of the overlay tunnels. Further, the stored set of predetermined policies defines a way the plurality of KPIs is interpreted when identifying the overlay tunnel for forwarding to the selected gateway node 104 and determining the dynamic routing indicator. The policy store 210 further maintains dynamically updated policies generated through administrative input, or machine-learning (ML) based optimization modules. The mid-link server 208 retrieves applicable policies from the set of predetermined policies at runtime to determine whether the ingress tunnel traffic should be routed to a particular gateway or rerouted to another gateway in response to current network conditions. In some embodiments, the policy store 210 also enforces restrictions against unauthorized routing configurations or anomalous tunnel patterns by comparing real-time metrics against enterprise-defined rules.

The enterprise server(s) 212 are backend management servers or cloud-hosted control platforms that facilitate configuration, orchestration, and lifecycle management of the load-aware balancing system 100. The enterprise server(s) 212 communicate with the mid-link server 208, the policy store 210, and the metric collector 110 to push updated policies, network routing preferences, the KPI weighting rules, and data retention configurations of the plurality of KPIs used for dynamic tunnel load distribution decisions. The enterprise server(s) 212 may also manage authentication, authorization, and role-based access control for administrators who monitor or modify system behavior. Updated configurations or policies generated at the enterprise server(s) 212 are propagated to the mid-link server 208 to support real-time decision-making for distributing the ingress tunnel traffic across the available gateway node 104.

Figure 3:
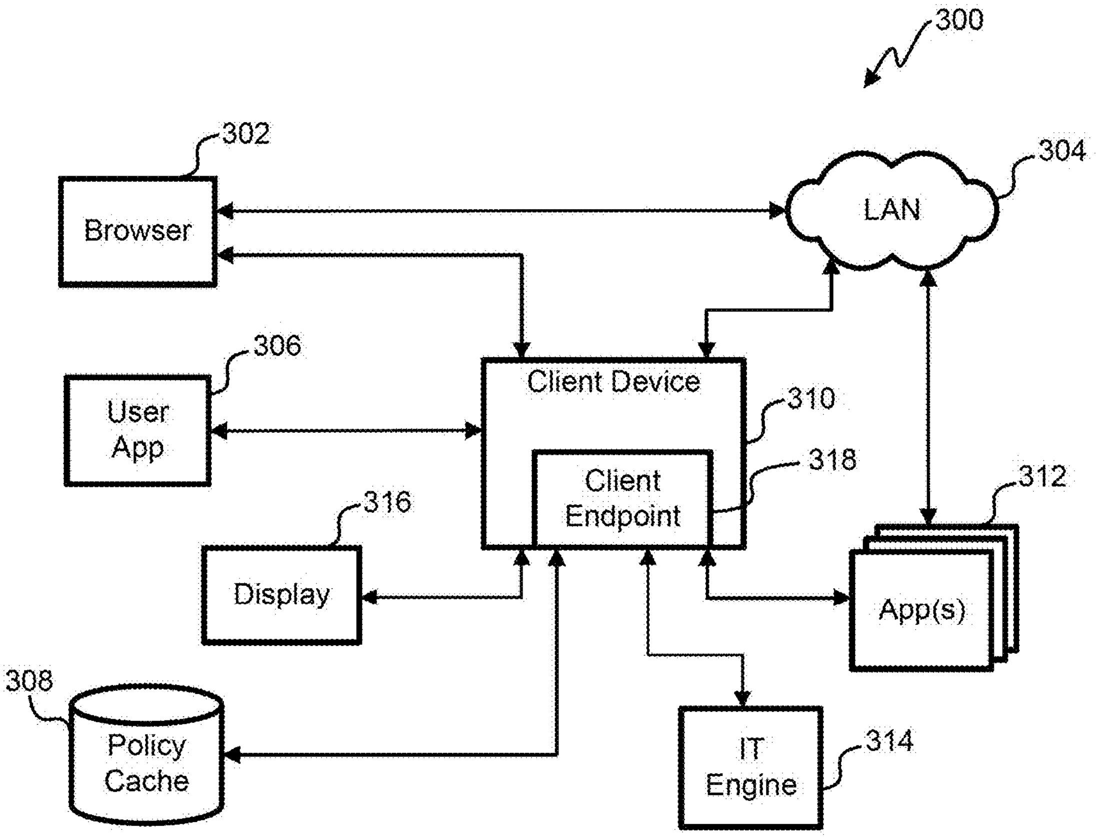
FIG. 3 illustrates a block diagram of an end-user device that uses an end-user to establish connections with the mid-link server and communicates using one or more gateway nodes with the mid-link server for routing ingress tunnel traffic through a plurality of overlay tunnels.

Referring to FIG. 3, a block diagram of an end-user device(s) 300 that communicates with the gateway nodes 104 and the mid-link server 108 for routing the ingress tunnel traffic through the plurality of overlay tunnels is shown. The end-user device(s) 300 include a browser 302, a Local Area Network (LAN) 304, a user application (app) 306, a policy cache 308, a client device 310, applications (apps) 312, an Information Technology (IT) engine 314, a display 316, and a client endpoint 318.

The end-user device(s) 300 execute the app(s) 312 and the browser 302 that enables the client device 310 to initiate secure overlay tunnel connections over the LAN 304 towards the one or more applications or services. The browser 302 and the app(s) 312 may be routed through the gateway nodes 104 using domain name services (DNS) based steering or policy-driven enforcement. Alternatively, the user app 306 may natively integrate with a tunnel routing engine through Application Programming Interfaces (APIs) that ensure that the ingress tunnel traffic is directed to the gateway nodes 104.

The policy cache 308 is the same as the policy cache 112 and stores device-specific configuration parameters, such as the high-priority tunnels, the dynamic routing indicator, or pre-negotiated credentials locally on the end-user device(s)

300. The IT engine 314 ensures compliance with the set of predefined policies and enforces enterprise connectivity rules by monitoring overlay tunnel establishment attempts, validating configuration integrity, and reporting overlay tunnel failures or policy violations. The display 316 provides the client device 310 with access to network status indicators, connectivity prompts, and notifications related to the overlay tunnel establishment or re-routing events handled by the mid-link server 108.

In some embodiments, the user app 306 is a local or a browser-based application on the client device 310 that generates network requests and initiates overlay tunnel connections toward the gateway nodes 104. The user app 306 may include enterprise applications, collaboration tools, or web clients whose ingress tunnel traffic is routed through the mid-link server 108 for dynamic tunnel distribution. Multiple instances of the user app 306 may operate simultaneously to produce independent ingress tunnel traffic that is processed, measured, and assigned to respective overlay tunnels. In some embodiments, the user app 306 may simply be a default browser generating HTTPS or API traffic, which is received by gateway nodes 104 and processed by the mid-link server 108.

In some embodiments, the policy cache 308 is a local store on the mid-link server 108 that retains routing, load-balancing, and tunnel-selection policies that are locally applied on the end-user device(s) 300. The policy cache 308 is synchronized with the policy store 210 via the mid-link server 108 to ensure updated policies are enforced. The set of policies stored in the policy cache 308 is used by client-side modules to govern the behavior of the browser 302, the user app 306, or the app(s) 312 communicating over the LAN 304 through the mid-link server 108. The policy cache 308 maintains the updated KPI weights, threshold values, and routing rules used by the mid-link server 108 to determine the tunnel load and the node load. By caching the set of predetermined policies locally, the load-aware balancing system 100 enables low latency and reliable tunnel allocation based on real-time network conditions.

In some embodiments, the load balancer 114 determines the tunnel load for overlay tunnels based on the weighted and normalized combination of the KPIs. The tunnel load corresponds to a normalized utilization value that represents the overall performance health of the overlay tunnel. In an exemplary embodiment, the tunnel load is calculated using an expression: "Tunnel Load=$w_1\cdot$(bw/max_bw)+$w_2\cdot$(pps/max_pps)+$w_3\cdot$(latency/max_latency)+$w_4\cdot$(jitter/max_jitter)+$w_5\cdot$(packet_loss/max_packet_loss)". Here, $w_1$-$w_5$ represents weighting coefficients assigned to the respective KPIs based on their relative importance in determining the tunnel load and may be dynamically adjusted according to the set of predefined set of policies. The variable bw corresponds to the bandwidth utilization. The values max_bw, max_pps, max_latency, max_jitter, and max_packet_loss correspond to predefined threshold or top acceptable values for KPIs, enabling normalization of the performance metrics and preventing any single KPI from disproportionately influencing the tunnel load determination.

In some embodiments, the load balancer 114 determines the node load for gateway nodes 104 by aggregating the tunnel loads of overlay tunnels terminating at the corresponding gateway node. The node load represents a cumulative utilization measure that reflects the overall processing, network, and forwarding demand placed on the gateway node 104. In an exemplary embodiment, the node load is computed according to an expression: "Node Load=$\Sigma$ (Tunnel $\text{Load}_i$)". Here, the summation represents the total of the tunnel loads associated with overlay tunnels i terminating at the gateway node 104.

In some embodiments, the IT engine 314 provides an administrative interface for monitoring network activity, policy execution, and gateway-selection behavior associated with the end-user device(s) 300. The IT engine 314 further provides an interface to review policy activity, alerts, and violations generated on the end-user device(s) 300. The IT engine 314 enables the administrators to review the KPIs, premium tenants/customer, SLA requirements of premium tenants, observe routing decisions made by the mid-link server 108, and identify anomalies such as persistent tunnel congestion or degraded gateway-node performance. The IT engine 314 also allows the administrators to update the set of predefined policies, adjust the KPI weighting profiles, and deploy the updated set of predefined policies to the policy cache 308.

The client endpoint 318 interfaces with the mid-link server 108 to connect the client device 310 with the mid-link server 108. The client endpoint 318 includes a client endpoint function configured to execute on the client device 310 while coupled to an overlay tunnel using tunnel endpoints (not shown).

Figure 4:
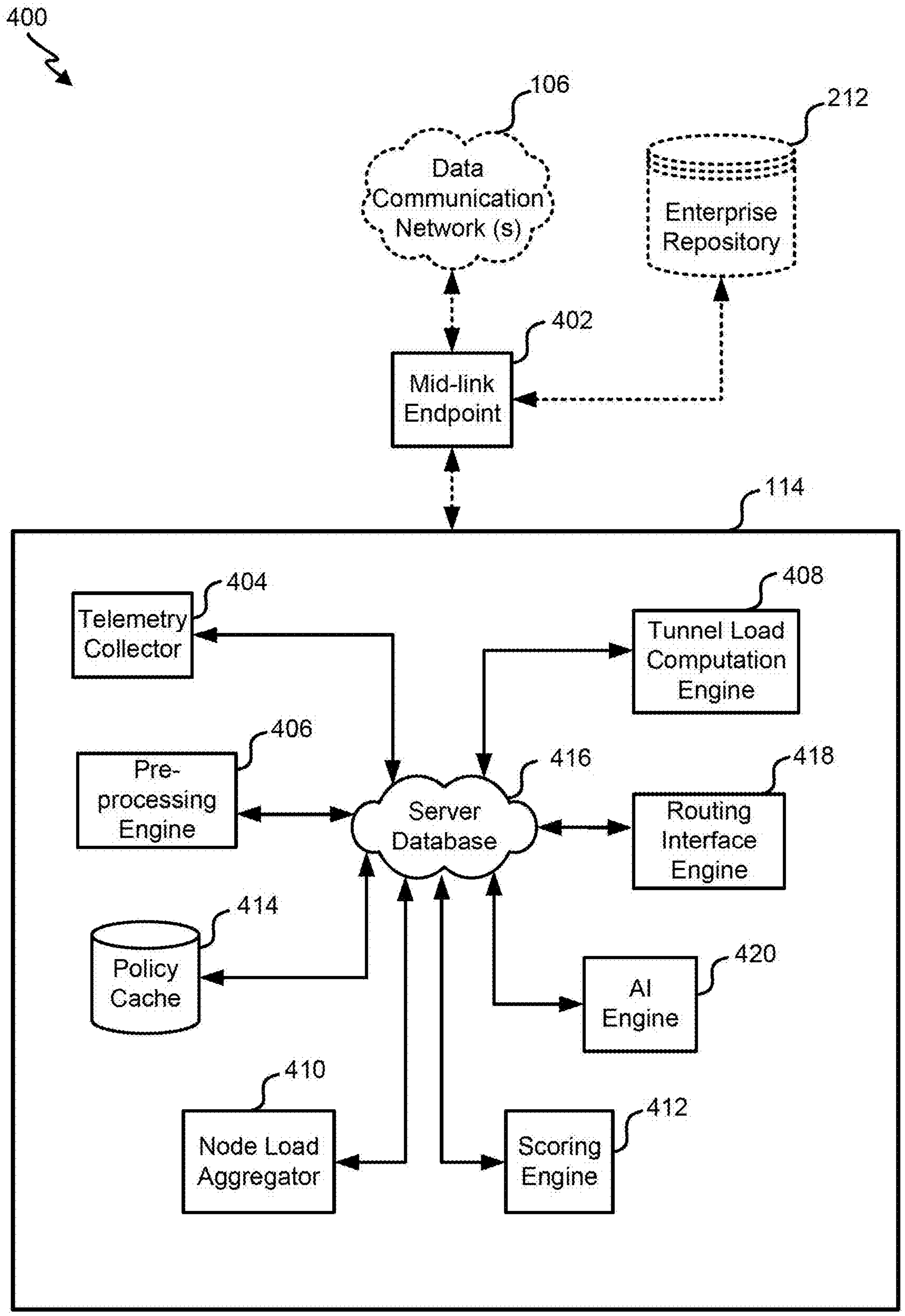
FIG. 4 illustrates a block diagram of internal components of a mid-link server.

Referring to FIG. 4, a block diagram of internal components of a mid-link server 400 is shown. The mid-link server 400 is same as the mid-link server 108. The mid-link server 400 includes various components, including a mid-link endpoint 402, and the load balancer 114. The load balancer 114 includes a telemetry collector 404, a pre-processing engine 406, a tunnel load computation engine 408, a node load aggregator 410, a scoring engine 412, a policy cache 414, a server database 416, a routing interface engine 418, and an AI engine 420.

The mid-link endpoint 402 is connected to the data communication network(s) 106 and interfaces with the enterprise server(s) 212 to synchronize the set of predefined policies, the KPI weighting profiles, and historical load metrics entailed for routing decisions. The server database 416 is a central mode of communication and storage for the various components of the mid-link server 400.

The mid-link endpoint 402 serves as a primary communication interface between the end-user device(s) 102 and the mid-link server 400 by connecting with the client endpoint 318 of the end-user device(s) 102. The mid-link endpoint 402 ensures that the ingress tunnel traffic intended for overlay tunnel transport is routed through the mid-link server 400. The mid-link endpoint 402 also establishes and maintains the plurality of overlay tunnels, coordinates tunnel admission decisions, and synchronizes with the enterprise server(s) 212 such that the set of predefined policies and the KPI weighting profiles remain available for real-time enforcement.

The telemetry collector 404 extracts the real-time KPIs from the gateway nodes 104. The plurality of KPIs includes performance metrics such as the bandwidth utilization, the PPS, the latency, the jitter, the packet loss, and the server resource utilization. The extracted KPIs are forwarded to the pre-processing engine 406 of the mid-link server 400 to support accurate, and context-aware gateway node selection.

The pre-processing engine 406 filters, validates, and normalizes the raw extracted KPIs before they are used by the tunnel load computation engine 408. The pre-processing engine 406 removes outliers, aligns the plurality of KPIs to a common time base, enriches incomplete data, and ensures that the subsequent tunnel load computation engine 408 receives consistent and reliable inputs.

The tunnel load computation engine 408 determines the tunnel load for overlay tunnels based on the plurality of KPIs. The determined tunnel load indicates instantaneous health of the overlay tunnel and provides a unified metric used for routing decisions, congestion avoidance, and tunnel admission control. The tunnel load is determined as a weighted combination of one or more of the KPIs, including the bandwidth utilization, the PPS, the latency, the jitter, and the packet loss. KPIs are normalized to a predefined top value.

The node load aggregator 410 determines the node load for the gateway nodes 104 based on the tunnel load of the respective overlay tunnels terminating at gateway node 104. The node load for gateway nodes 104 is determined by aggregating the tunnel load of the overlay tunnels terminating at the corresponding gateway node 104. The node load aggregator 410 generates a node health score that indicates combined compute, network, and tunnel pressure, and enables the mid-link server 400 to avoid overloading any single gateway node 104. In some embodiments, a feedback loop is provided wherein the gateway nodes 104 regularly export the updated KPIs to the server database 416, and the load balancer 114 dynamically adjusts overlay tunnel distribution decisions based at least on the tunnel load and the node load.

The scoring engine 412 determines a dynamic routing indicator for gateway nodes 104 by utilizing the tunnel load, the node load, the plurality of KPIs, and the set of predefined policies. The determined dynamic routing indicator is used to determine the gateway node 104 for handling the ingress tunnel traffic and to support dynamic re-routing during congestion events.

The policy cache 414 stores locally accessible versions of the set of predefined policies. The set of predefined policies includes at least one of the enterprise-level routing rules, the KPI weighing profiles, congestion thresholds, and the failover rules. The policy cache 414 ensures that the mid-link server 400 can enforce routing decisions even during intermittent connectivity with the enterprise server (s) 212.

The server database 416 maintains historical telemetry records, prior routing decisions, node performance trends, and usage logs of the overlay tunnel. The historical telemetry records support analytics, troubleshooting, and policy optimization. The routing interface engine 418 interacts with gateway nodes 104, and other network elements to apply routing decisions generated by the scoring engine 412.

The routing interface engine 418 distributes selected gateway node assignments, updates overlay tunnel mappings and ensures that routing changes propagate consistently across overlay environment.

The AI engine 420 evaluates historical and real-time traffic patterns using a number of methods to determine the tunnel load for effective load balancing. Depending on data conditions, the AI engine 420 may employ a simple average peak method, a weighted average peak method, a percentile threshold peak method, or a K-means clustering peak method. The weighted average peak method assigns importance to specific time slots. The percentile threshold peak method identifies unusually high traffic periods. The K-means clustering peak method groups the time slots by traffic similarity to detect complex peak patterns. Daily peak traffic volume and weekly peak traffic volume are determined to enable transparent and reliable determination of the tunnel load.

Figure 5:
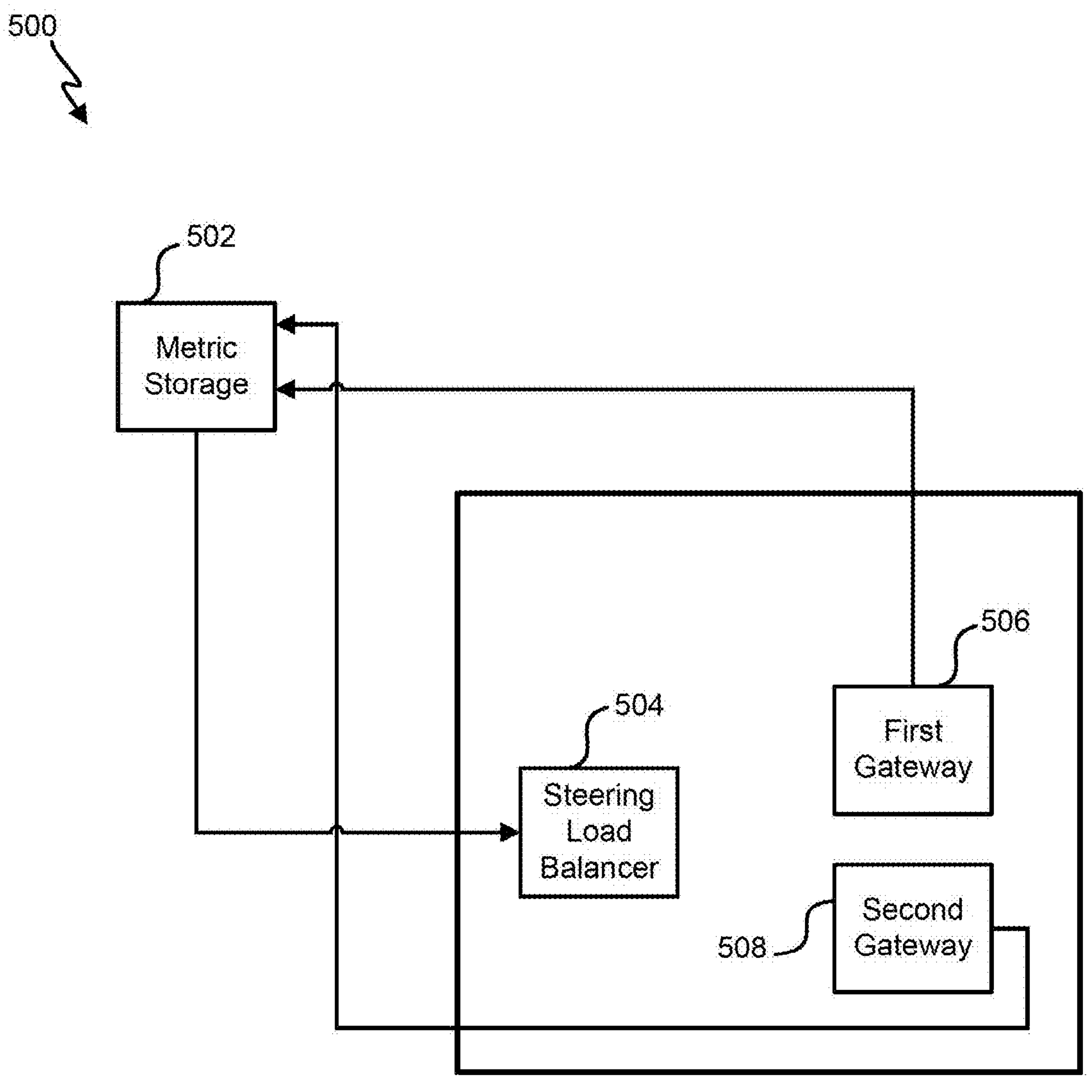
FIG. 5 illustrates a flow diagram of a load-aware balancing system.

Referring to FIG. 5, a flow diagram of a load-aware balancing system 500 is shown. The load-aware balancing system 500 includes a metric storage 502 that functions as a centralized repository for storing the plurality of KPIs received from the gateway nodes 104 in the server database 416. The metric storage 502 is operatively coupled to a steering load balancer 504. The steering load balancer 504 is the same as the load balancer 114. The steering load balancer 504 receives the plurality of KPIs, along with the tunnel load and the node load, from the metric storage 502. The steering load balancer 504 utilizes the plurality of KPIs, the tunnel load, and the node load to determine the dynamic routing indicator for selecting the gateway node 104 for forwarding the ingress tunnel traffic.

Further, the metric storage 502 is operationally coupled to a first gateway 506 and a second gateway 508, each of which represents examples of gateway nodes 104 capable of terminating the plurality of overlay tunnels. The first gateway 506 can include an IPsec gateway or any other type of gateway. The second gateway 508 can include a GRE gateway or any other type of gateway. The first gateway 506 and the second gateway 508 regularly provide the real-time KPIs to the metric storage 502. The plurality of KPIs includes the bandwidth utilization, the PPS, the latency, the jitter, the packet loss, and the server resource utilization. The metric storage 502 aggregates and stores the plurality of KPIs for access by the steering load balancer 504 and enables the steering load balancer 504 to dynamically update the tunnel load, the node load, and the dynamic routing indicator based on the plurality of KPIs.

In an exemplary embodiment, an end-to-end operational flow is provided to illustrate how the load-aware balancing system 100 distributes the ingress tunnel traffic based on the tunnel load and the node load. In a scenario, following assumptions are made. Five overlay tunnels, identified as T1, T2, T3, T4, and T5, are expected to individually utilize approximately 1 gigabyte (GB) of bandwidth. Three gateway nodes, designated as GW1, GW2, and GW3, are provisioned with substantially equal forwarding and compute capacity. A steering load balancer distributes the ingress tunnel traffic across the three gateway nodes. Further, following weighting and normalization parameters are assumed for calculating the tunnel load: bandwidth weight $W_1$=40, PPS weight $W_2$=60, a top bandwidth (max_bw)=10 GB, and a top PPS rate (max_pps)=2,000,000 pps.

Based on the normalization parameters, the tunnel load for a tunnel operating at 1 GB and 200,000 PPS is calculated as: "Tunnel Load=40×(1/10)+60×(200,000/2,000,000)=4+6=10".

When the overlay tunnels T1, T2, and T3 first become active, the steering load balancer assigns overlay tunnels to a separate gateway node because gateway nodes 104 may initially exhibit an equivalent node load. T1 is assigned to GW1 with a tunnel load of 10 and a corresponding node load of 10; T2 is assigned to GW2 with a tunnel load of 10 and a corresponding node load of 10; and T3 is assigned to GW3 with a tunnel load of 10 and a corresponding node load of 10.

Further, assume the ingress tunnel traffic on the overlay tunnels T1 and T2 increases to approximately 4 GB and 800,000 PPS. A continuous feedback loop from the gateway nodes enables the steering load balancer to receive the updated bandwidth utilization and the updated PPS. Using the updated KPIs, the steering load balancer recalculates the tunnel load for T1 and T2 as: Tunnel Load=40×(4/10)+60×(800,000/2,000,000)=16+24=40.

As a result of the recalculation, GW1 now has a node load of 40 based on the updated tunnel load of T1, and GW2 has a node load of 40 based on the updated tunnel load of T2. GW3, continues to handle overlay tunnels T3, T4, and T5 operating at approximately 1 GB and 200,000 PPS and exhibits a tunnel load of 10 for overlay tunnels and therefore maintains a combined node load of 30. When the overlay tunnels T4 and T5 subsequently initiate the ingress tunnel traffic, the steering load balancer identifies GW3 as the favorable gateway node because GW3 exhibits the minutest node load relative to GW1 and GW2. The steering load balancer assigns both T4 and T5 to GW3 to maintain balanced resource utilization across the gateway nodes and prevent additional traffic from being routed to already stressed gateway nodes.

Figure 6:
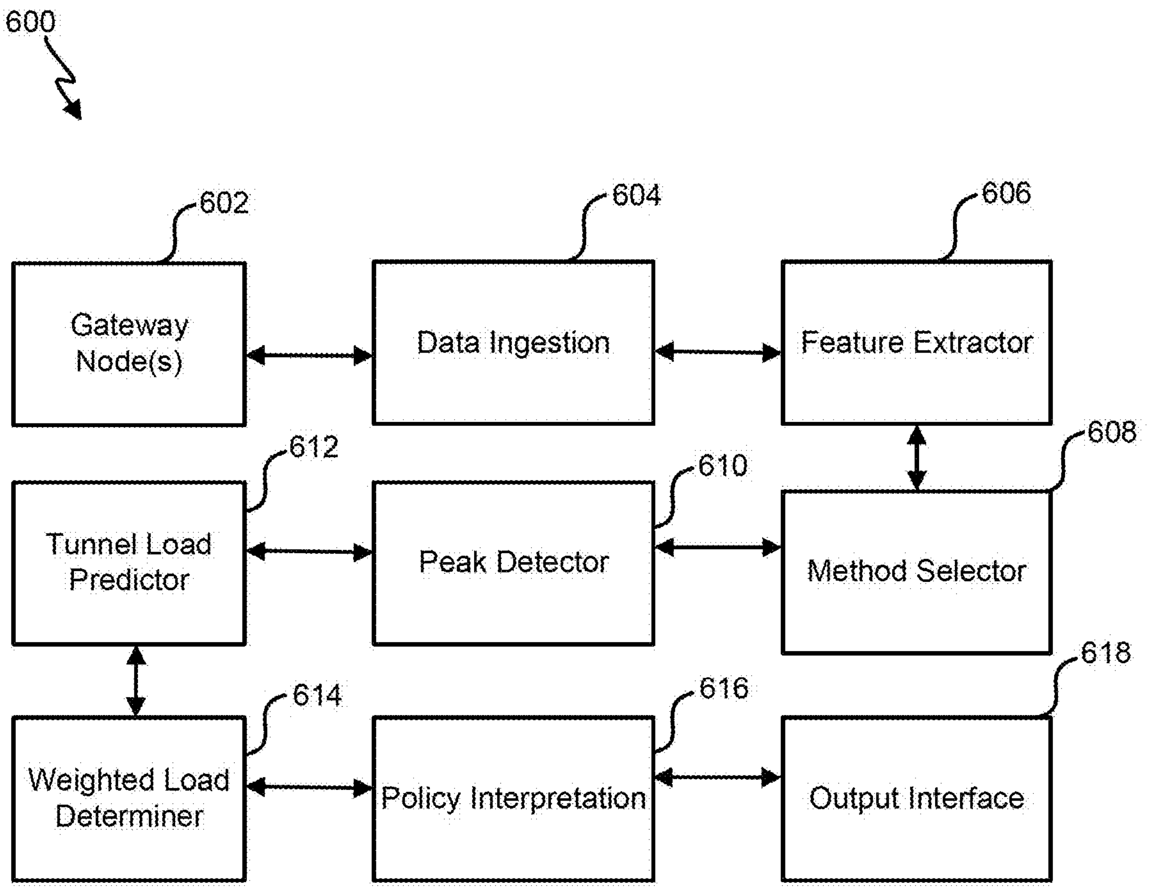
FIG. 6 illustrates a block diagram of an Artificial Intelligence (AI) engine to determine daily and weekly peak traffic volume.

Referring to FIG. 6, a block diagram of internal components of an AI engine 600 is shown. The AI engine 600 is same as the AI engine 420. The AI engine 600 includes gateway node(s) 602, a data ingestion 604, a feature extractor 606, a method selector 608, a peak detector 610, a tunnel load predictor 612, a weighted load determiner 614, a policy interpretation 616, and an output interface 618.

The data ingestion 604 acquires the plurality of KPIs from the gateway node(s) 602. The plurality of KPIs corresponds to historical or real-time traffic telemetry associated with the gateway node(s) 602 and the overlay tunnels. The acquired plurality of KPIs includes the bandwidth utilization, the PPS, the latency, the jitter, and the packet loss, the server resource utilization, and corresponding timestamps.

The feature extractor 606 collects daily traffic data for several time slots for a 24-hour day. Days are divided into several equal-length time slots, and volume of the ingress tunnel traffic associated with overlay tunnels is measured and recorded for the time slots across several weekdays. The feature extractor 606 derives time-series features from the normalized KPIs. The derived features include slot-level averages, hourly and daily usage patterns, peak traffic indicators, percentile-based traffic indicators, and cluster-based traffic indicators. The derived features represent characteristic behavioral attributes of the plurality of overlay tunnels and prepare the plurality of KPIs for analysis, and statistical modelling by other components of the AI engine 600.

The method selector 608 determines a method from the number of methods for determining the tunnel load. The method corresponds to an appropriate peak-detection methodology. The method selector 608 identifies a method among the simple average peak method, the weighted-average peak method, the percentile-threshold peak method, or the K-means clustering-based peak method. The selection ensures that the AI engine 600 uses the best suitable method under prevailing conditions.

The peak detector 610 implements the method selected by the method selector 608 to identify peak traffic slots for overlay tunnels. The peak detector 610 determines daily peak traffic volume, weekly peak traffic volume, and average peak traffic volume. The peak traffic volume helps in evaluating the tunnel health and contributes to the accuracy of tunnel load prediction, tunnel prioritization, and routing decisions.

The tunnel load predictor 612 applies Artificial Intelligence (AI)/Machine Learning (ML) models for forecasting techniques to estimate future tunnel load conditions. The tunnel load predictor 612 estimates surge periods, tunnel-specific behavioral patterns, and SLA-sensitive load variations associated with the overlay tunnels. The predictions enable proactive routing decisions that reduce congestion and increase tunnel reliability.

The weighted load determiner 614 identifies adjusted tunnel load by applying the KPI weighting profiles and the priority weighting factors. The high-priority tunnels, SLA-sensitive flows, or the plurality of overlay tunnels associated with the dedicated nodes receive additional weighting to elevate the tunnel load. The policy interpretation 616 evaluates enterprise-defined routing rules, the SLA requirements, tunnel-priority policies, congestion thresholds, and operational constraints of the overlay tunnels. Based on the stored set of predefined policies, the policy interpretation 616 determines application of the peak traffic volume to the routing decisions, tunnel ranking, and the congestion threshold adjustments.

The output interface 618 provides predicted peak tunnel loads, adjusted tunnel loads, tunnel priority rankings, and gateway node recommendations. The output interface 618 ensures that the decisions generated by the AI engine 600 are propagated in real-time to support dynamic routing and tunnel management.

In some embodiments, the tunnel load may be determined using multiple mathematical formulations, tailored to capture different aspects of tunnel behavior. In one embodiment, the load balancer 114 employs a weighted tunnel load determination, where the tunnel load is determined as: "Weighted Tunnel Load=(w1*(pps/pps_max))+(w2*(Mbps/Mbps_max))", such that the PPS and the bandwidth utilization (Mbps) are normalized to the respective top values and scaled by weighting factors w1 and w2 to reflect their relative contribution to congestion.

In another embodiment, the load balancer 114 utilizes an exponential tunnel load determination to amplify effect of high-traffic conditions. The tunnel load is determined as: "Exponential Tunnel Load=(pps/pps_max)^exp1×(Mbps/Mbps_max)^exp2×Scaling_Factor", where exp1 and exp2 correspond to exponential coefficients that increase the non-linear impact of the elevated PPS or the bandwidth utilization levels.

In yet another embodiment, the tunnel load may account for packet-loss conditions using a loss-adjusted tunnel load determination, where the tunnel load is determined as: "Tunnel Load with Loss=(pps/pps_max)×(Mbps/Mbps_max)×(1−(packet_loss/100))×Scaling_Factor".

In yet another embodiment, delay sensitivity is incorporated using a delay-adjusted tunnel load determination, where the tunnel load is determined as: "Tunnel Load with Delay=(pps/pps_max)×(Mbps/Mbps_max)×(1/(1+queuing_delay))×Scaling_Factor".

In yet another embodiment, the load balancer 114 may determine the tunnel load using a combined tunnel load computation that aggregates the bandwidth utilization, the PPS, the packet loss, the latency, and the jitter. The tunnel load is determined as: Combined Tunnel Load="w1(pps/pps_max)+w2(Mbps/Mbps_max)+w3*(1−(packet_loss/100))+w4*(1/(1+queuing_delay))".

Figure 7:
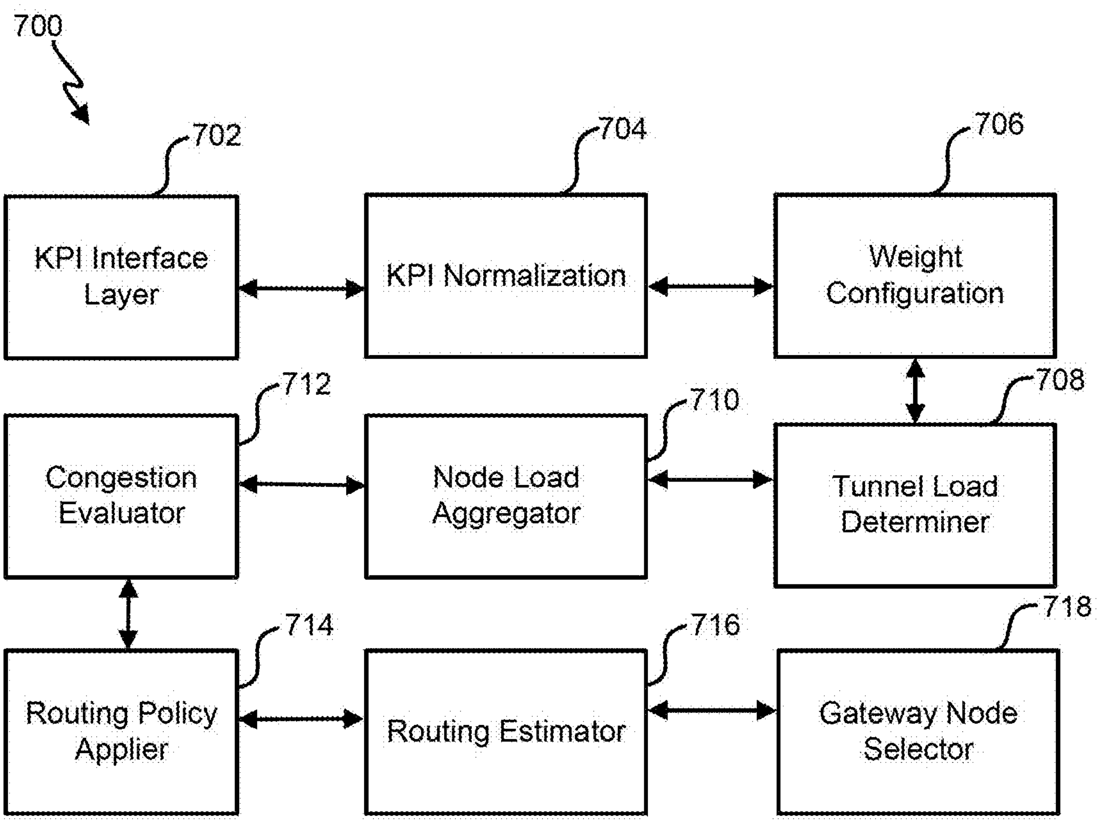
FIG. 7 illustrates a block diagram of a scoring engine to determine dynamic routing indicator.

Referring to FIG. 7, a block diagram of internal components of a scoring engine 700 is shown. The scoring engine 700 is same as the scoring engine 412. The scoring engine 700 includes a key performance indicators (KPI) interface layer 702, a KPI normalization 704, a weight configuration 706, a tunnel load determiner 708, a node load aggregator 710, a congestion evaluator 712, a routing policy applier 714, a routing estimator 716, and a gateway node selector 718.

The KPI interface layer 702 extracts the plurality of KPIs associated with the plurality of overlay tunnels from the gateway nodes 104. The KPI interface layer 702 communicates with the gateway nodes 104 or the metric collector 110 to extract the plurality of KPIs such as the bandwidth utilization, the PPS, the latency, the jitter, the packet loss, and the server resource utilization. The KPI interface layer 702 normalizes the extracted KPIs and aligns corresponding timestamps to ensure that the plurality of KPIs are synchronized for subsequent scoring operations performed by the scoring engine 700.

The KPI normalization 704 converts the extracted KPIs into standardized values suitable for weighted scoring. The KPIs are normalized to eliminate variations caused by differing measurement units or ranges. The KPI normalization 704 manages missing, old, or partial KPI values.

The weight configuration 706 applies and manages priority weighting factors used by the scoring engine 700 for tunnel load determination, node load aggregation, and routing decision calculations. The weight configuration 706 dynamically updates the priority weighting factors according to the set of predefined policies and the high-priority tunnels.

The tunnel load determiner 708 estimates the tunnel load associated with overlay tunnels based on the normalized KPIs. The determined tunnel load represents the instantaneous performance condition of the overlay tunnels and serves as a foundational metric for node load determination and dynamic routing indicator determination. In some embodiments, the weight configuration 706 prioritizes the high-priority tunnels by applying the priority weighting factor to the tunnel load of the respective high-priority tunnel. The high-priority tunnels include tunnels with the dedicated nodes, and the SLA requirements. Further, the tunnel load of the high-priority tunnel includes the additional parameter in the priority weighting factor for the determination of the tunnel load.

The node load aggregator 710 determines the node load for gateway nodes 104 based on the tunnel loads of the overlay tunnels terminating at the respective gateway node 104. The determined node load represents potential capacity constraints at the respective gateway node 104.

The congestion evaluator 712 determines whether a gateway node 104 of the gateway nodes 104 is operating in an overloaded, stressed, or an underloaded state. The congestion evaluator 712 detects congestion indicators such as increased tunnel latency, elevated packet loss, abnormal jitter, or elevated node-level compute or memory utilization. The congestion evaluator 712 enables the load balancer 114 to avoid routing the ingress tunnel traffic to the gateway nodes 104 in degraded operating conditions. The routing policy applier 714 interprets the set of predefined policies relating to avoidance of overloaded gateway nodes, preference for the gateway nodes with available capacity, and prioritization of the high-priority tunnels.

The routing estimator 716 determines the dynamic routing indicator for gateway nodes 104 based on the plurality of KPIs, the tunnel load, the node load, and the priority weighting factors. The dynamic routing indicator provides a quantitative score representing suitability of the gateway node for handling the ingress tunnel traffic. A higher dynamic routing indicator indicates an ideal gateway node for routing based on current network conditions, the plurality of KPIs, the tunnel load, the node load, and the set of predefined policies.

The gateway node selector 718 ranks the gateway nodes 104 based on the determined dynamic routing indicator and determines the gateway node 104 for forwarding the one or more overlay tunnels. The gateway node selector 718 provides final routing recommendation to the load balancer 114 for real-time execution.

Figure 8:
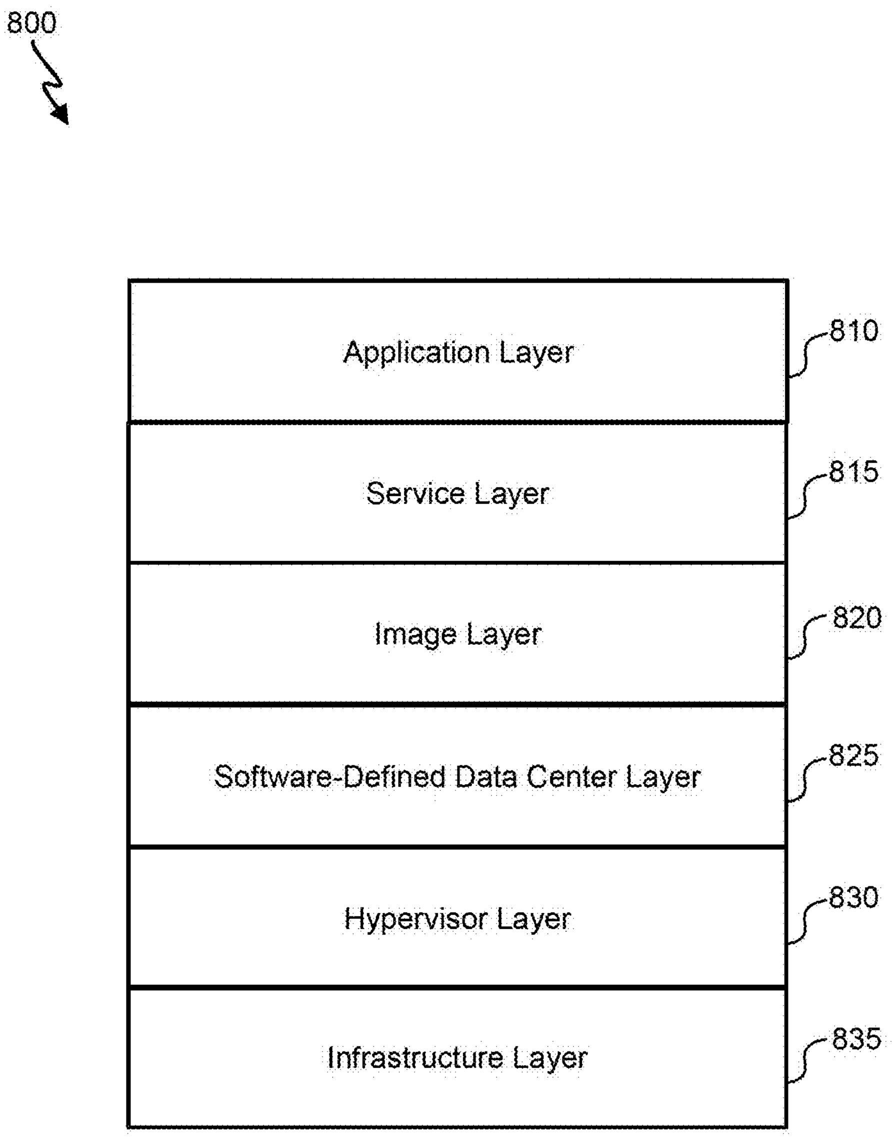
FIG. 8 illustrates a block diagram of an embodiment of an Open Systems Interconnection (OSI) model.

Referring to FIG. 8, a block diagram of an embodiment of a cloud OSI model 800 is shown. The cloud OSI model 800 for cloud computing environments partitions the flow of data in a communication system into six layers of abstraction. The cloud OSI model 800 for cloud computing environments can include, in order, an application layer 810, a service layer 815, an image layer 820, a software-defined data center layer 825, a hypervisor layer 830, and an infrastructure layer 835. The respective layers serve a class of functionality to the layer above it and are served by the layer below it. Classes of functionality can be realized in software by various communication protocols.

The infrastructure layer 835 can include hardware, such as physical devices in a data center, that provides the foundation for the rest of the layers. The infrastructure layer 835 can transmit and receive unstructured raw data between a device and a physical transmission medium. For example, the infrastructure layer 835 can convert the digital bits into electrical, radio, or optical signals.

The hypervisor layer 830 can perform virtualization, which can permit the physical devices to be divided into virtual machines that can be bin packed onto physical machines for greater efficiency. The hypervisor layer 830 can provide virtualized computing, storage, and networking. For example, OpenStack® software that is installed on bare metal servers in a data center can provide virtualization cloud capabilities. The OpenStack® software can provide various infrastructure management capabilities to cloud operators and administrators and can utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 825 can provide resource pooling, usage tracking, and governance on top of the hypervisor layer 830. The software-defined data center layer 825 can enable the creation of virtualization for the infrastructure-as-Code concept by using representational state transfer (REST) APIs. The management of block storage devices can be virtualized, and end-users can be provided with a self-service API to request and consume those resources, which do not entail any knowledge of where the storage is deployed or on what type of device. Various computing nodes can be balanced for storage.

The image layer 820 can use various operating systems and other pre-installed software components. Patch management can be used to identify, acquire, install, and verify patches for products and systems. Patches can be used to correct security and functionality problems in software. Patches can also be used to add new features to operating systems, including security capabilities. The image layer 820 can focus on the compute in place of storage and networking. The instances within the cloud computing environments can be provided at the image layer 820.

The service layer 815 can provide middleware, such as functional components that applications use in tiers. In some examples, the middleware components can include databases, load balancers, web servers, message queues, email services, or other notification methods. The middleware components can be defined at the service layer 815 on top of particular images from the image layer 820. Different cloud computing environment providers can have different middleware components.

The application layer 810 can interact with software applications that implement a communicating component. The application layer 810 is the layer that is closest to the end-user. Functions of the application layer 810 can include identifying communication partners, determining resource availability, and synchronizing communication. Applications within the application layer 810 can include custom code that makes use of middleware defined in the service layer 815.

Various features discussed above can be performed at several layers of the cloud OSI model 800 for cloud computing environments. For example, translating the general policies into specific policies for different cloud computing environments can be performed at the service layer 815 and the software-defined data center layer 825. Various scripts can be updated across the service layer 815, the image layer 820, and the software-defined data center layer 825. Further, APIs and policies can operate at the software-defined data center layer 825 and the hypervisor layer 830.

Respective different cloud computing environments can have a different service layer 815, image layer 820, software-defined data center layer 825, hypervisor layer 830, and infrastructure layer 835. Further, respective different cloud computing environments can have an application layer 810 that can make calls to the specific policies in the service layer 815 and the software-defined data center layer 825. The application layer 810 can have noticeably the same format and operation for different cloud computing environments. Accordingly, developers for the application layer 810 do not entail understanding the peculiarities of how respective cloud computing environments operate in the other layers.

The load balancer 114 of the mid-link server 108 operates at the software-defined data center layer 825 of the cloud OSI model 800.

Figure 9:
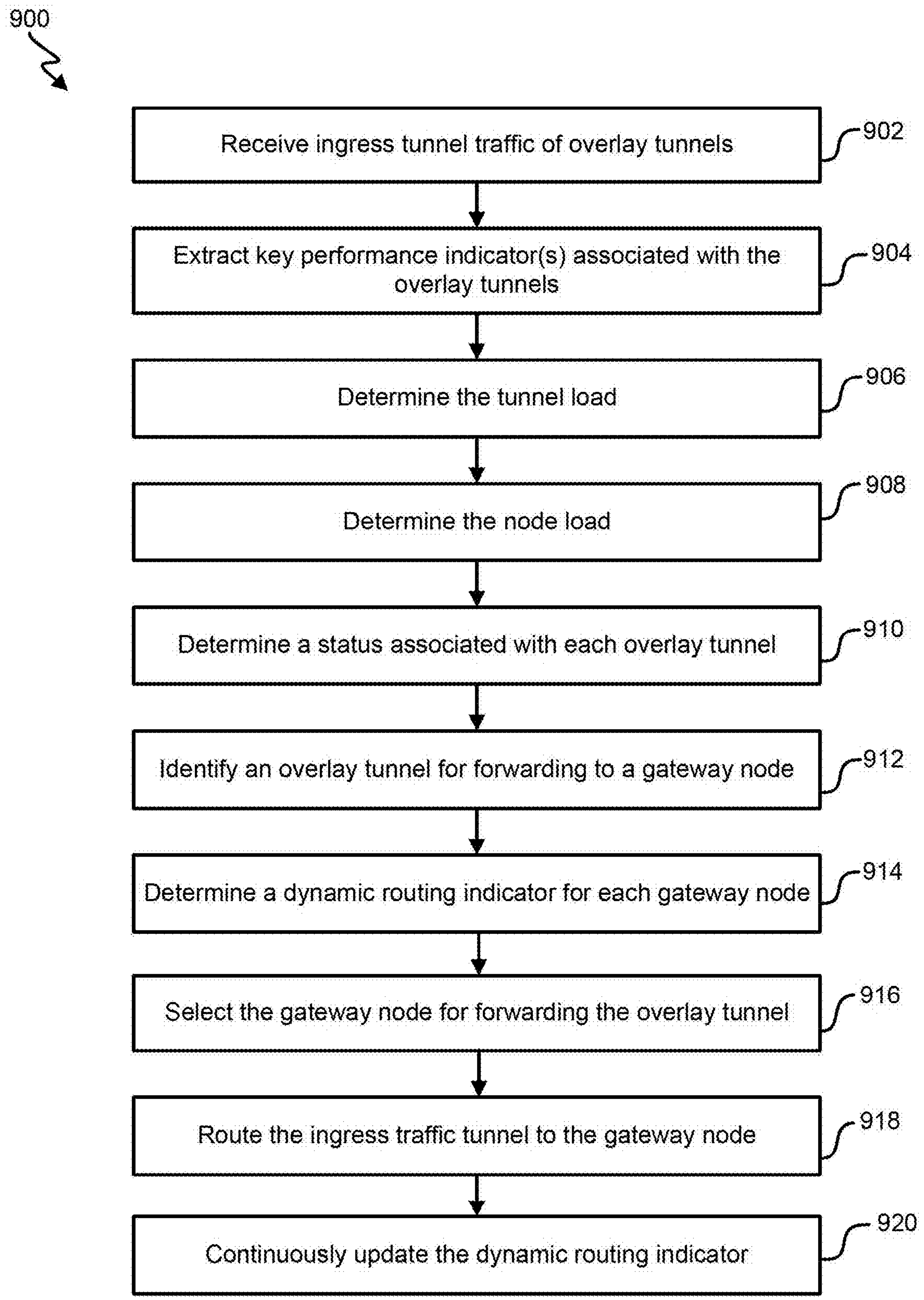
FIG. 9 illustrates a flowchart of an embodiment of distributing the ingress tunnel traffic based on the tunnel load.

Referring to FIG. 9, a flowchart of a process 900 for distributing the ingress tunnel traffic based on the tunnel load is shown. The process 900 begins at block 902, where the ingress tunnel traffic of the plurality of overlay tunnels is received at the gateway nodes 104. The incoming overlay tunnels terminate at the gateway nodes 104 and are forwarded to the mid-link server 108 for analysis and load-aware decision making.

At block 904, the load balancer 114 of the mid-link server 108 extracts the plurality of KPIs associated with the overlay tunnels. The plurality of KPIs represent real-time telemetry such as the bandwidth utilization, the PPS, the latency, the jitter, the packet loss, and the server resource utilization. The plurality of KPIs serves as the basis for subsequent load computations.

At block 906, the load balancer 114 determines the tunnel load of overlay tunnels based on the extracted KPIs. The tunnel load is determined as a weighted or normalized combination of the plurality of KPIs, allowing accurate representation of the load contribution of overlay tunnels to the respective gateway node 104.

At block 908, the load balancer 114 determines the node load for the gateway nodes 104 based on the tunnel loads of the overlay tunnels terminating at the gateway node 104. The node load for gateway nodes 104 is determined by aggregating the tunnel load of the plurality of overlay tunnels associated with the respective gateway node 104. The node load reflects current processing, network, and resource pressure experienced by the gateway nodes 104.

At block 910, the status associated with the overlay tunnels for forwarding the one or more overlay tunnels to the gateway node 104 is determined by the load balancer 114. The status may indicate whether the overlay tunnel is an incoming new overlay tunnel or an existing overlay tunnel experiencing degradation based on KPI trends and the determined tunnel load.

At block 912, the load balancer 114 identifies the one or more overlay tunnels for forwarding to the gateway node 104 based on the status of the one or more overlay tunnels. The status associated with overlay tunnels is one of an incoming new overlay tunnel, or an overloaded tunnel. The overloaded tunnel is an existing overlay tunnel experiencing degradation.

At block 914, the load balancer 114 determines a dynamic routing indicator for gateway nodes 104 based on the node load, tunnel load, and the plurality of KPIs. The dynamic routing indicator reflects relative suitability of the gateway node 104 to receive additional overlay tunnels.

At block 916, the load balancer 114 selects a gateway node 104 from the gateway nodes 104 for forwarding the identified one or more overlay tunnels based on the dynamic routing indicator. The selection is based on the dynamic routing indicator, ensuring that the gateway node 104 with the best load condition is chosen.

At block 918, the load balancer 114 routes the ingress tunnel traffic of the one or more overlay tunnels to the selected gateway node 104. The routing ensures that the overlay tunnel is processed by the best appropriate gateway node 104 according to the real-time load conditions.

At block 920, the load balancer 114 regularly updates the dynamic routing indicator based at least on a change in at least one of the plurality of KPIs, such that subsequent ingress tunnel traffic associated with the plurality of overlay tunnels is routed according to the updated dynamic routing indicator. Updated dynamic routing indicator ensures that subsequent ingress tunnel traffic associated with the overlay tunnels is routed to the gateway node 104 according to the recent network and node conditions.

Figure 10:
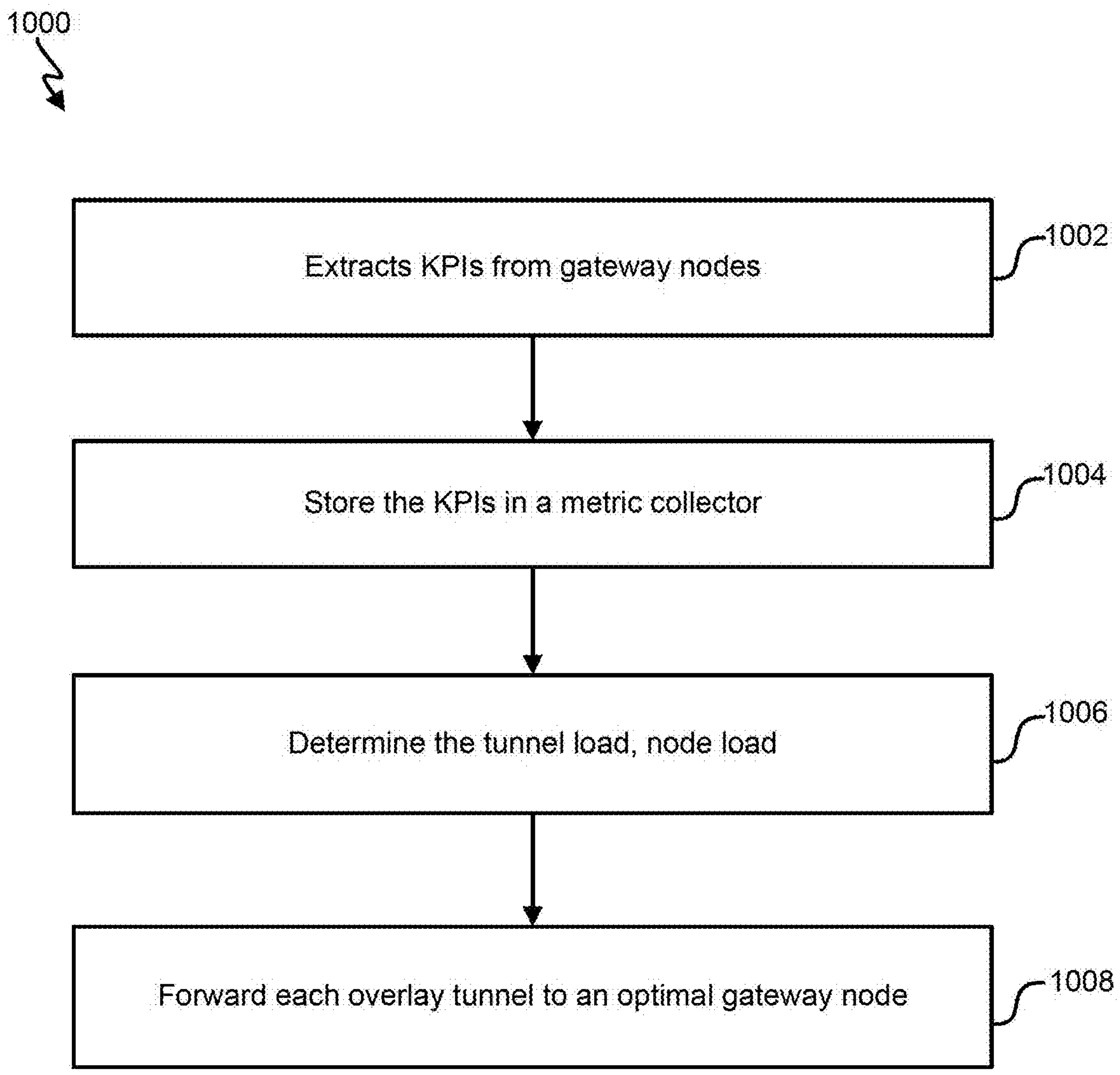
FIG. 10 illustrates a flowchart of an embodiment of collecting metrics and determining routes for a plurality of overlay tunnels.

Referring to FIG. 10, a flowchart of a process 1000 for collecting metrics and determining routes for the plurality of overlay tunnels is shown. The process 1000 begins at block 1002, where the mid-link server 108 extracts the plurality of KPIs associated with the plurality of overlay tunnels, from the gateway nodes 104. The plurality of KPIs comprises at least one of the bandwidth utilization, the PPS, the latency, jitter, the packet loss, and the server resource utilization. The plurality of KPIs is wanted for adapting to changing traffic patterns, determining health of the gateway nodes 104, the tunnel load, the node load, and resource availability.

At block 1004, the extracted plurality of KPIs is stored in the metric collector 110. The metric collector 110 stores the plurality of KPIs in the database of the metric collector 110. The metric collector 110 aggregates the plurality of KPIs along with the timestamps from the gateway nodes 104 to enable consistent and synchronized evaluation. The storage of the plurality of KPIs in the metric collector 110 ensures that the mid-link server 108 has access to real-time updated KPIs for determining the tunnel load and the node load. Further, the metric collector 110 applies the set of predefined policies on the plurality of KPIs stored in the database based on an analysis of the load balancer 114 and the storage capacity of the server database 416. The gateway nodes 104 regularly provide real-time KPIs to the metric collector 110 that stores the real-time KPIs in the database.

At block 1006, the load balancer 114 of the mid-link server 108 determines the tunnel load and the node load based on the plurality of KPIs stored in the metric collector 110. The tunnel load represents a weighted, normalized load value for each overlay tunnel of the plurality of overlay tunnels. The node load represents an aggregate performance score for each gateway node 104 of the gateway nodes 104. The tunnel load and the node load are determined to reflect real-time resource pressure and performance conditions across the load-aware balancing system 100 and enable dynamic and context-aware routing decisions. The load balancer 114 dynamically updates the tunnel load based on the current plurality of KPIs. Further, the load balancer 114 dynamically updates the node load based on the updated tunnel load. Thereafter, the load balancer 114 dynamically updates the dynamic routing indicator based on the updated node load and the updated tunnel load.

The load balancer 114 included in the mid-link server 108 further determines the status associated with overlay tunnels for forwarding one or more overlay tunnels to the gateway node 104. The status associated with each overlay tunnel is one of an incoming new overlay tunnel, or an overloaded tunnel. The overloaded tunnel is the existing overlay tunnel experiencing degradation. The dynamic routing indicator is updated based on the status, and the updated dynamic routing indicator is used to select the gateway node 104 for forwarding the new overlay tunnel, or the overloaded tunnel to the selected gateway node 104. Further, the load balancer 114 identifies the one or more overlay tunnels for forwarding to the gateway node 104 based on the status of the one or more overlay tunnels. The load balancer 114 further determines the dynamic routing indicator for the gateway nodes 104.

At block 1008, the load balancer 114 included in the mid-link server 108 selects the gateway node 104 from the gateway nodes 104 for forwarding the one or more overlay tunnels based on the dynamic routing indicator. The selection of the gateway node 104 is based on the determined tunnel load and the node load and ensures that the ingress tunnel traffic is routed in a manner that avoids overload and maintains performance efficiency. After selection of the gateway node 104, the ingress tunnel traffic of the one or more overlay tunnels is routed to the selected gateway node 104. In some embodiments, the dynamic routing indicator is regularly updated based on a change in at least one of the plurality of KPIs, such that subsequent ingress tunnel traffic associated with the plurality of overlay tunnels is routed to the gateway node 104 according to the updated dynamic routing indicator.

Figure 11:
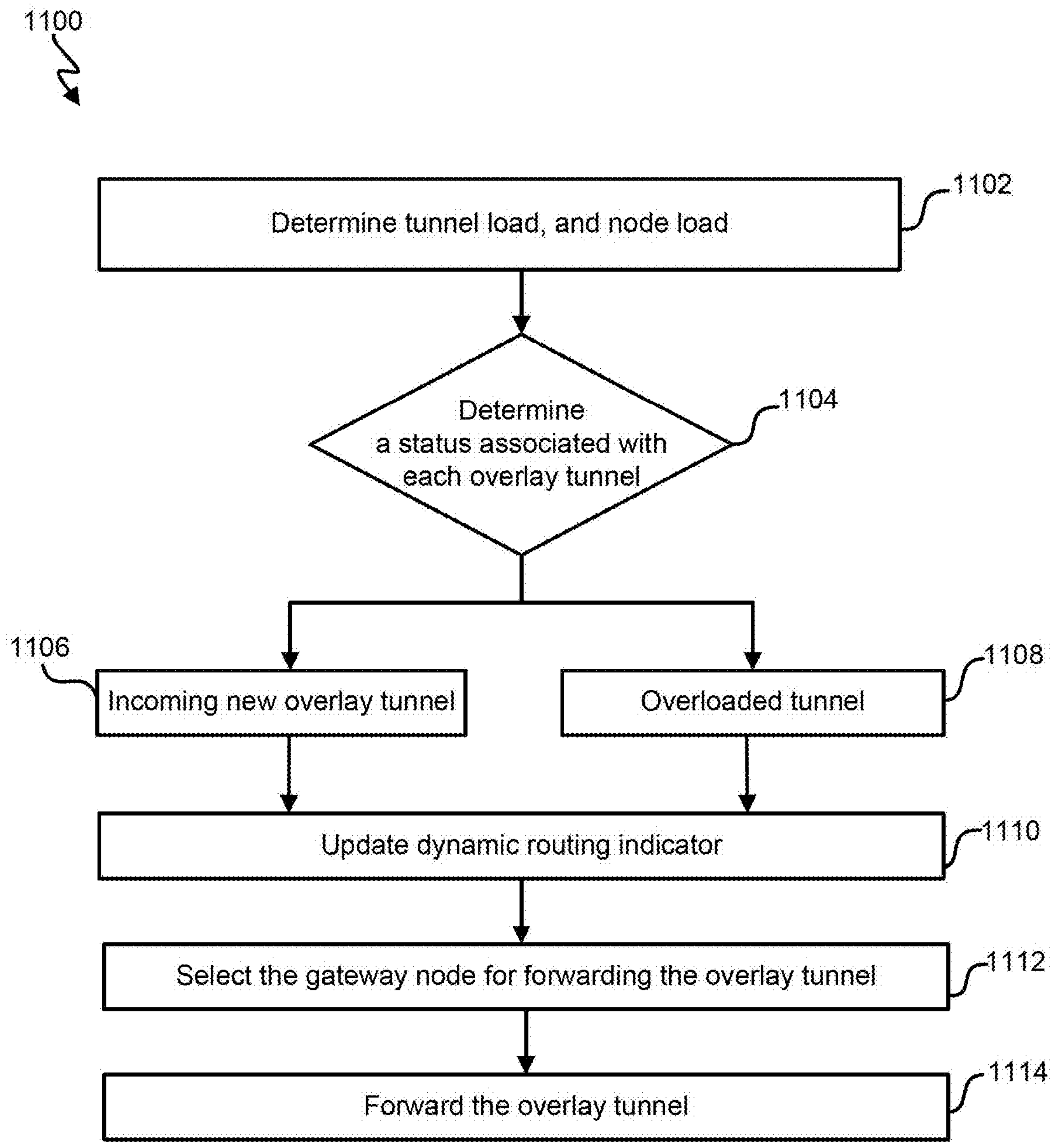
FIG. 11 illustrates a flowchart of an embodiment of performing dynamic load-aware routing of a plurality of overlay tunnels based on status associated with each overlay tunnel.

Referring to FIG. 11, a flowchart of a process 1100 for performing dynamic load-aware routing of the overlay tunnels based on the status associated with the plurality of overlay tunnels is shown. The process 1100 begins at block 1102, where the load balancer 114 included in the mid-link server 108 determines the tunnel load for each overlay tunnel and the node load for each of the gateway nodes 104. The tunnel load is determined by using the plurality of KPIs associated with each overlay tunnel. The node load is determined based on the tunnel loads of the overlay tunnels terminating at the respective gateway node 104 and reflects an aggregated health score of the gateway nodes 104. The determination of the tunnel load and the node load enables the mid-link server 108 to obtain a real-time view of performance conditions across the gateway nodes 104.

At block 1104, the load balancer 114 determines the status associated with each overlay tunnel. The status associated with the overlay tunnel is one of the incoming new overlay tunnels, or the overloaded tunnel. The overloaded tunnel is the existing overlay tunnel experiencing degradation. In one example, the status may include whether the overlay tunnel is healthy, degraded, or approaching an overload condition based on the determined tunnel load and the node load.

At block 1106, the load balancer 114 evaluates whether there is an incoming new overlay tunnel. When a new overlay tunnel request is detected, the mid-link server 108 proceeds with determining whether the new overlay tunnel must be forwarded, redistributed, or load-balanced based on the plurality of KPIs, the tunnel load of the new overlay tunnel, and the node load of the gateway nodes 104.

At block 1108, the load balancer 114 determines whether an overlay tunnel is overloaded. The overloaded tunnel is the existing overlay tunnel experiencing degradation. The overlay tunnel is considered overloaded when the determined tunnel load exceeds a policy-defined threshold. If the overlay tunnel is not overloaded, the process 1100 continues toward routing minus redistribution. If the overlay tunnel is overloaded, the process 1100 goes to block 1110.

At block 1110, the load balancer 114 updates the dynamic routing indicator for the gateway nodes 104. The dynamic routing indicator reflects near real-time routing suitability based on at least one of the plurality of KPIs, the tunnel load, the node load, and the determined status of the overlay tunnel. The dynamic routing indicator is regularly refreshed to ensure that routing decisions adapt to changing traffic and operational conditions.

At block 1112, the load balancer 114 selects the gateway node 104 for forwarding the overlay tunnel. The selection is based on the updated dynamic routing indicator and ensures that the ingress tunnel traffic is directed to the gateway node 104 that currently presents the top favorable performance conditions in terms of the KPIs. The selection of the gateway node 104 avoids routing the overlay tunnels to the gateway nodes 104 experiencing congestion, degradation, or elevated resource pressure.

At block 1114, the overlay tunnel is forwarded to the selected gateway node 104. The forwarding action completes the load-aware routing operation and ensures that the ingress tunnel traffic is distributed across the gateway node 104 in a manner that enhances resiliency, prevents overload, and maintains network performance.

Figure 12:
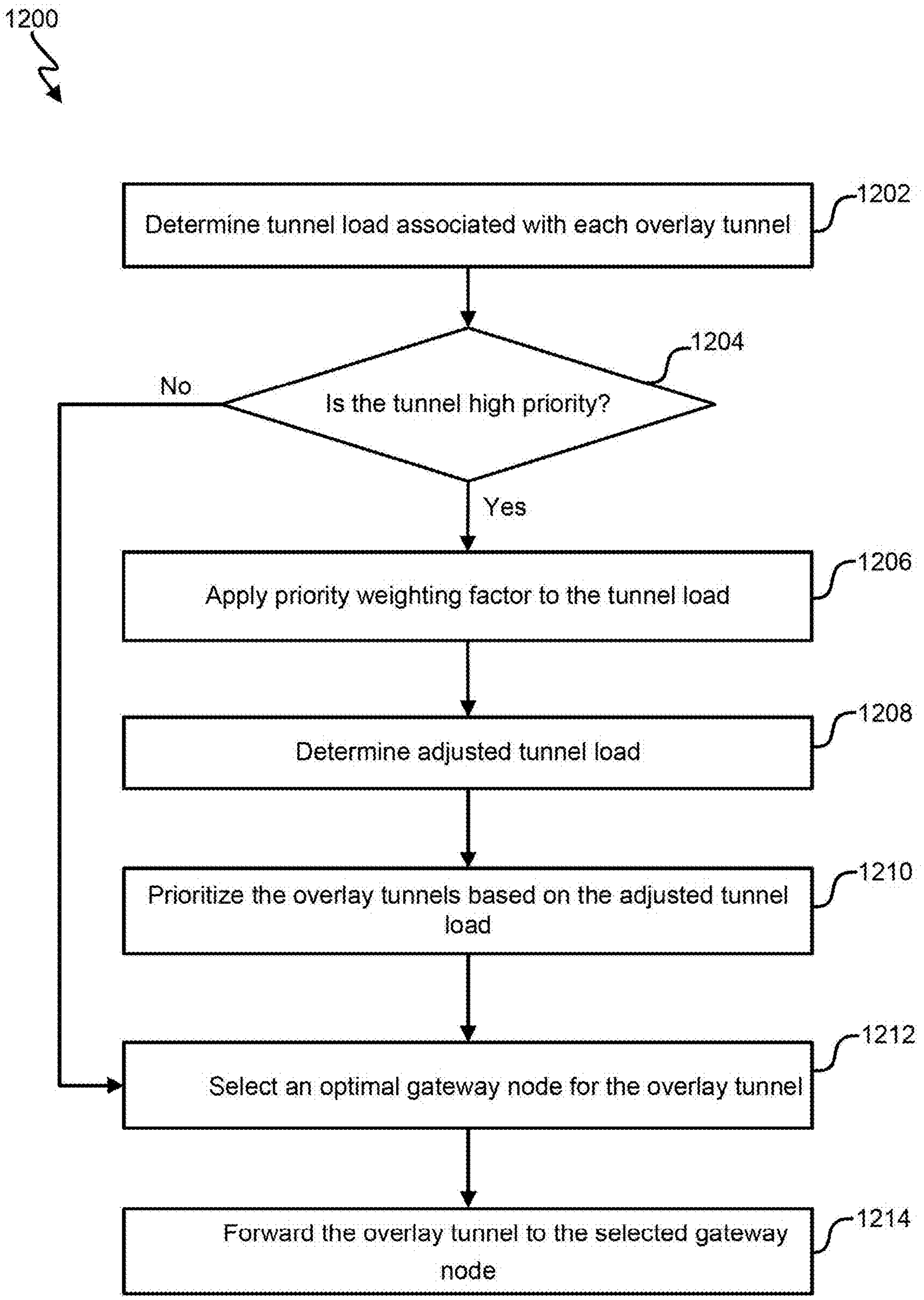
FIG. 12 illustrates a flowchart of an embodiment of prioritizing high-priority overlay tunnels during load-aware routing.

Referring to FIG. 12, a flowchart of a process 1200 for prioritizing high-priority overlay tunnels during load-aware routing is shown. The process 1200 begins at block 1202, where the load balancer 114 determines the tunnel load associated with the overlay tunnels. The tunnel load is determined by using the plurality of KPIs. The tunnel load is determined as a weighted combination of one or more of the bandwidth utilization, the PPS, the latency, the jitter, and the packet loss. The KPIs are normalized to the predefined top value and indicate real-time operational condition of the overlay tunnels.

At block 1204, the load balancer 114 determines whether the overlay tunnel is a high-priority tunnel. High-priority tunnels may include tunnels associated with the dedicated nodes, the tunnels supporting critical workloads, or the tunnels governed by SLA requirements. The determination may be based on the set of predefined policies including at least one of enterprise policies, metadata, or tunnel-classification rules stored within the load-aware balancing system 100. The high-priority tunnels correspond to premium tunnels. In one embodiment, the process 1200 moves to block 1206 if the overlay tunnel is the high-priority tunnel. In another embodiment, the process 1200 moves to block 1212 if the overlay tunnel is a non-priority tunnel.

At block 1206, if the overlay tunnel is identified as the high-priority tunnel, the mid-link server 108 applies a priority weighting factor to the tunnel load of the respective high-priority tunnel. The priority weighting factor is a policy-defined parameter that increases weight of the high-priority tunnel during the load-aware routing decisions. The priority weighting factor modifies contribution of one or more of the plurality of KPIs in the tunnel load determination to ensure elevated routing preference. The tunnel load of the high-priority tunnel includes an additional parameter in the priority weighting factor for determination of the tunnel load.

At block 1208, the load balancer 114 determines an adjusted tunnel load for the high-priority tunnel. The adjusted tunnel load incorporates the priority weighting factor and represents enhanced priority level of the high-priority tunnel relative to other overlay tunnels. For the non-priority tunnels, the tunnel load is equal to the original tunnel load since the tunnel load is not adjusted or if the tunnel load is adjusted, the adjusted tunnel load is below a predetermined threshold value.

At block 1210, the load balancer 114 prioritizes the overlay tunnels based on the adjusted tunnel loads. The high-priority tunnels with the applied priority weighting factor are elevated in routing precedence to ensure that resource allocation and the gateway node selection satisfy critical performance demands and the SLA requirements.

At block 1212, the load balancer 114 selects the gateway node 104 for the overlay tunnel. The overlay tunnel may be one of the high-priority tunnels or the non-priority tunnels. The selection of the gateway node 104 is based on the adjusted tunnel load, the node load, the dynamic routing indicator, and overall load distribution strategy of the load-aware balancing system 100. The high-priority tunnels may be assigned to the gateway nodes 104 with lower congestion or higher available resources to ensure performance guarantees.

At block 1214, the load balancer 114 forwards the overlay tunnel to the selected gateway node 104. The forwarding operation ensures that the high-priority overlay tunnels receive preferential routing treatment consistent with the enterprise policy, the SLA requirements, and real-time network conditions.

Figure 13:
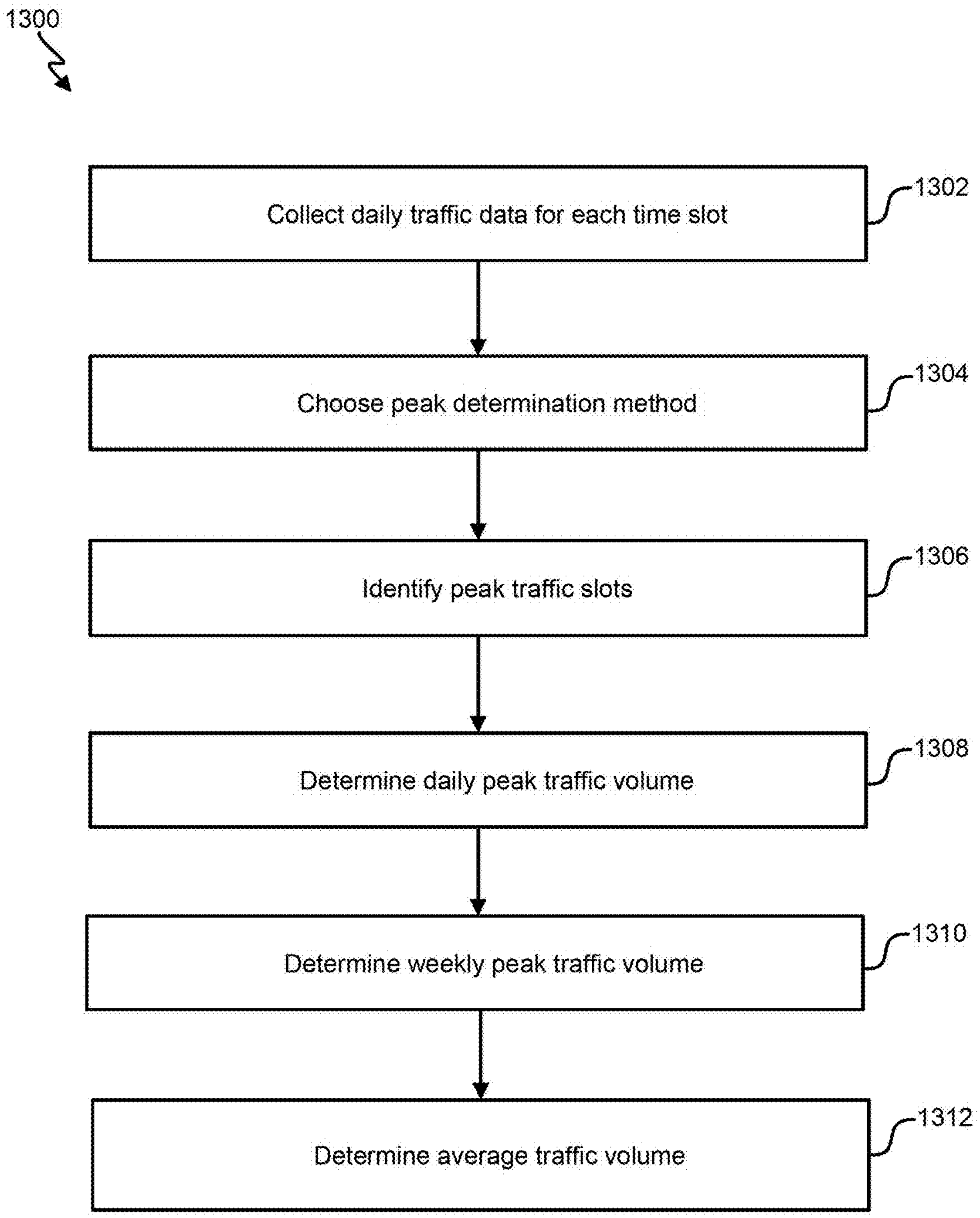
FIG. 13 illustrates a flowchart of an embodiment of determining peak traffic characteristics for tunnel load determination using an AI engine.

Referring to FIG. 13, a flowchart of a process 1300 for determining peak traffic characteristics for tunnel load determination using an AI engine 420 is shown. The process 1300 begins at block 1302, where the load balancer 114 collects daily traffic data for each time slot for a 24-hour day. Each day is divided into several equal-length time slots, and volume of the ingress tunnel traffic associated with each overlay tunnel is measured and recorded for each time slot across several weekdays. The number of weekdays includes Monday, Tuesday, Wednesday, Thursday, and Friday.

At block 1304, the load balancer 114 selects a peak-determination method from several methods. The number of methods includes, but is not limited to, the simple average peak method, the weighted average peak method, the percentile threshold peak method, and the K-Means clustering peak method. The selection may be based on enterprise policies, data availability, computational resources, or the historical variability of ingress tunnel traffic patterns. The selected method governs how peak periods will be identified for subsequent tunnel load determination.

At block 1306, the selected peak-determination method identifies peak traffic slots. In the simple average peak method, for each weekday, top three time slots with top average traffic volumes are identified. In the weighted average method, for each weekday, weights are applied to each slot based on historical traffic patterns before determining top weighted time slots. In one example, morning rush hour time slots may receive higher weight than late nighttime slots. In the percentile threshold peak method, for each weekday, traffic volume percentiles are determined. The traffic volume percentile represents the traffic volume above which a certain percentage of traffic falls. The time slots where the average traffic volume exceeds a predefined percentile threshold are selected. In K-Means clustering peak method, the time slots having similar traffic patterns are grouped together. Cluster(s) representing top traffic concentration is identified.

At block 1308, the load balancer 114 determines daily peak traffic volume for each weekday. In one example, the selected peak slots are aggregated by averaging the traffic volume of the top three peak time slots to estimate a daily peak traffic volume estimate. The daily peak traffic volume reflects top expected load periods for the corresponding overlay tunnel and captures day-specific variations in overlay tunnel usage.

At block 1310, the load balancer 114 determines a weekly peak traffic volume by aggregating the daily peak values obtained across the number of weekdays. In one embodiment, the mid-link server 108 averages the determined daily peak traffic volume of each weekday to determine weekly peak traffic volume. The weekly peak traffic volume provides a stabilized measure of the overlay tunnel's peak load profile over a typical operating cycle.

At block 1312, the load balancer 114 determines an average traffic volume for the plurality of overlay tunnels. The determination of the average traffic volume may include calculating mean of daily average values. The average traffic volume may be used as a parameter in the determination of the tunnel load or to validate consistency of the peak traffic estimates.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps, and means described above may be done in various ways. For example, these techniques, blocks, steps, and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

While the principles of the disclosure have been described above in connection with specific apparatuses and methods, it is to be clearly understood that this description is made only by way of example and not as a limitation on the scope of the disclosure.

We claim:

1. A load-aware balancing system for distributing ingress tunnel traffic based on tunnel load, the load-aware balancing system comprises:
- one or more gateway nodes configured to receive the ingress tunnel traffic of a plurality of overlay tunnels, wherein the plurality of overlay tunnels terminate at the one or more gateway nodes; and
- a mid-link server operatively coupled to the one or more gateway nodes, wherein the mid-link server includes a load balancer configured to:
  - extract from the one or more gateway nodes, a plurality of key performance indicators (KPIs) associated with the plurality of overlay tunnels;

determine the tunnel load for each overlay tunnel based on the plurality of KPIs;

determine a node load for each gateway node of the one or more gateway nodes based on tunnel loads of overlay tunnels terminating at a corresponding gateway node;

determine a status associated with each overlay tunnel of the plurality of overlay tunnels for forwarding one or more overlay tunnels to a gateway node;

identify the one or more overlay tunnels for forwarding to the gateway node based on the status of the one or more overlay tunnels;

determine, based on the node load, the tunnel load, and the plurality of KPIs, a dynamic routing indicator for each of the one or more gateway nodes;

select the gateway node from the one or more gateway nodes for forwarding the one or more overlay tunnels based on the dynamic routing indicator;

route the ingress tunnel traffic of the one or more overlay tunnels to the selected gateway node; and regularly update the dynamic routing indicator based on a change in at least one of the plurality of KPIs, wherein subsequent ingress tunnel traffic associated with the plurality of overlay tunnels is routed according to the updated dynamic routing indicator.

2. The load-aware balancing system for distributing the ingress tunnel traffic based on the tunnel load as recited in claim 1, wherein the plurality of KPIs comprises at least one of bandwidth utilization, packets per second (PPS), latency, jitter, packet loss, and server resource utilization.

3. The load-aware balancing system for distributing the ingress tunnel traffic based on the tunnel load as recited in claim 2, wherein the tunnel load is determined as a weighted combination of two or more of the bandwidth utilization, the PPS, the latency, the jitter, and the packet loss, and wherein each KPI is normalized to a predefined top value.

4. The load-aware balancing system for distributing the ingress tunnel traffic based on the tunnel load as recited in claim 1, wherein the status associated with each overlay tunnel is one of: an incoming new overlay tunnel, and an overloaded tunnel, wherein the overloaded tunnel is an existing overlay tunnel experiencing degradation, and wherein based on the status, the dynamic routing indicator is updated, and the updated dynamic routing indicator is used to select the gateway node for forwarding the new overlay tunnel, or the overloaded tunnel to the selected gateway node.

5. The load-aware balancing system for distributing the ingress tunnel traffic based on the tunnel load as recited in claim 1, wherein the plurality of overlay tunnels include Internet Protocol Security (IPSec) tunnels, Generic Routing Encapsulation (GRE) tunnels, Datagram Transport Layer Security (DTLS) tunnels, WireGuard tunnels, Secure Sockets Tunneling Protocol (SSTP) tunnels, Secure Sockets Layer (SSL) tunnels, Transport Layer Security (TLS) tunnel, or other tunnel types.

6. The load-aware balancing system for distributing the ingress tunnel traffic based on the tunnel load as recited in claim 1, further comprises a metric collector configured to store the plurality of KPIs in a database, wherein:

the metric collector is configured to apply predefined policies to the plurality of KPIs stored in the database based on an analysis of the load balancer, and a storage capacity of the database;

the one or more gateway nodes regularly provide a plurality of real-time KPIs to the metric collector that stores the plurality of real-time KPIs in the database and the load balancer is configured to dynamically update:

the tunnel load based on the plurality of real-time KPIs, the node load based on the updated tunnel load, and the dynamic routing indicator based on the updated node load and the updated tunnel load.

7. The load-aware balancing system for distributing the ingress tunnel traffic based on the tunnel load as recited in claim 1, wherein the load balancer is further configured to prioritize high-priority tunnels by applying a priority weighting factor to the tunnel load of a corresponding high-priority tunnel, wherein the high-priority tunnels include tunnels with dedicated nodes, and Service Level Agreement (SLA) requirements, and the tunnel load of a high-priority tunnel includes an additional parameter in the priority weighting factor for determination of the tunnel load.

8. A load balancing method for distributing ingress tunnel traffic based on tunnel load, the method comprises:

receiving, via one or more gateway nodes, the ingress tunnel traffic of a plurality of overlay tunnels, wherein the plurality of overlay tunnels terminate at the one or more gateway nodes;

extracting, via a load balancer of a mid-link server operatively coupled to the one or more gateway nodes, from the one or more gateway nodes, a plurality of key performance indicators (KPIs) associated with the plurality of overlay tunnels;

determining, via the load balancer, the tunnel load for each overlay tunnel based on the plurality of KPIs;

determining, via the load balancer, a node load for each gateway node of the one or more gateway nodes based on tunnel loads of overlay tunnels terminating at a corresponding gateway node;

determining, via the load balancer, a status associated with each overlay tunnel of the plurality of overlay tunnels for forwarding one or more overlay tunnels to a gateway node;

identifying, via the load balancer, the one or more overlay tunnels for forwarding to the gateway node based on the status of the one or more overlay tunnels;

determining, via the load balancer, based on the node load, the tunnel load, and the plurality of KPIs, a dynamic routing indicator for each of the one or more gateway nodes;

selecting, via the load balancer, the gateway node from the one or more gateway nodes for forwarding the one or more overlay tunnels based on the dynamic routing indicator;

routing, via the load balancer, the ingress tunnel traffic of the one or more overlay tunnels to the selected gateway node; and regularly updating, via the load balancer, the dynamic routing indicator based on a change in at least one of the plurality of KPIs, wherein subsequent ingress tunnel traffic associated with the plurality of overlay tunnels is routed according to the updated dynamic routing indicator.

9. The load balancing method for distributing the ingress tunnel traffic based on the tunnel load as recited in claim 8, wherein the plurality of KPIs comprises at least one of bandwidth utilization, packets per second (PPS), latency, jitter, packet loss, and server resource utilization.

10. The load balancing method for distributing the ingress tunnel traffic based on the tunnel load as recited in claim 9, wherein the tunnel load is determined as a weighted combination of two or more of the bandwidth utilization, the PPS, the latency, the jitter, and the packet loss, and wherein each KPI being normalized to a predefined top value.

11. The load balancing method for distributing the ingress tunnel traffic based on the tunnel load as recited in claim 8, wherein the status associated with each overlay tunnel is one of: an incoming new overlay tunnel, and an overloaded tunnel, wherein the overloaded tunnel is an existing overlay tunnel experiencing degradation, and wherein based on the status, the dynamic routing indicator is updated, and the updated dynamic routing indicator is used to select the gateway node for forwarding the new overlay tunnel, or the overloaded tunnel to the selected gateway node.

12. The load balancing method for distributing the ingress tunnel traffic based on the tunnel load as recited in claim 8, wherein the plurality of overlay tunnels include Internet Protocol Security (IPSec) tunnels, Generic Routing Encapsulation (GRE) tunnels, Datagram Transport Layer Security (DTLS) tunnels, WireGuard tunnels, Secure Sockets Tunneling Protocol (SSTP) tunnels, Secure Sockets Layer (SSL) tunnels, Transport Layer Security (TLS) tunnel, or other tunnel types.

13. The load balancing method for distributing the ingress tunnel traffic based on the tunnel load as recited in claim 8, further comprises:

storing, via a metric collector, the plurality of KPIs in a database, wherein:

the metric collector is configured to apply predefined policies to the plurality of KPIs stored in the database based on an analysis of the load balancer and a storage capacity of the database;

the one or more gateway nodes regularly provide a plurality of real-time KPIs to the metric collector that stores the plurality of real-time KPIs in the database; and the load balancer is configured to dynamically update: the tunnel load based on the plurality of real-time KPIs, the node load based on the updated tunnel load, and the dynamic routing indicator based on the updated node load and the updated tunnel load.

14. The load balancing method for distributing the ingress tunnel traffic based on the tunnel load as recited in claim 8, further comprises:

prioritizing, via the load balancer, high-priority tunnels by applying a priority weighting factor to the tunnel load of a corresponding high-priority tunnel, wherein the high-priority tunnels include tunnels with dedicated nodes, and Service Level Agreement (SLA) requirements, and the tunnel load of a high-priority tunnel includes an additional parameter in the priority weighting factor for determination of the tunnel load.

15. A non-transitory computer-readable storage medium having stored thereon instructions for causing at least one processor to execute a method for distributing ingress tunnel traffic based on tunnel load, wherein the method comprises:

receiving, via one or more gateway nodes, the ingress tunnel traffic of a plurality of overlay tunnels, wherein the plurality of overlay tunnels terminate at the one or more gateway nodes;

extracting, via a load balancer of a mid-link server operatively coupled to the one or more gateway nodes, from the one or more gateway nodes, a plurality of key performance indicators (KPIs) associated with the plurality of overlay tunnels;

determining, via the load balancer, the tunnel load for each overlay tunnel based on the plurality of KPIs;

determining, via the load balancer, a node load for each gateway node of the one or more gateway nodes based on tunnel loads of overlay tunnels terminating at a corresponding gateway node;

determining, via the load balancer, a status associated with each overlay tunnel of the plurality of overlay tunnels for forwarding one or more overlay tunnels to a gateway node;

identifying, via the load balancer, the one or more overlay tunnels for forwarding to the gateway node based on the status of the one or more overlay tunnels;

determining, via the load balancer, based on the node load, the tunnel load and the plurality of KPIs, a dynamic routing indicator for each of the one or more gateway nodes;

selecting, via the load balancer, the gateway node from the one or more gateway nodes for forwarding the one or more overlay tunnels based on the dynamic routing indicator;

routing, via the load balancer, the ingress tunnel traffic of the one or more overlay tunnels to the selected gateway node; and regularly updating, via the load balancer, the dynamic routing indicator based on a change in at least one of the plurality of KPIs, wherein subsequent ingress tunnel traffic associated with the plurality of overlay tunnels is routed according to the updated dynamic routing indicator.

16. The non-transitory computer-readable storage medium as recited in claim 15, wherein the plurality of KPIs comprises at least one of bandwidth utilization, packets per second (PPS), latency, jitter, packet loss, and server resource utilization.

17. The non-transitory computer-readable storage medium as recited in claim 16, wherein the tunnel load is determined as a weighted combination of two or more of the bandwidth utilization, the PPS, the latency, the jitter, and the packet loss, and wherein each KPI is normalized to a predefined top value.

18. The non-transitory computer-readable storage medium as recited in claim 15, wherein the status associated with each overlay tunnel is one of: an incoming new overlay tunnel, and an overloaded tunnel, wherein the overloaded tunnel is an existing overlay tunnel experiencing degradation, and wherein based on the status, the dynamic routing indicator is updated and the updated dynamic routing indicator is used to select the gateway node for forwarding the new overlay tunnel, or the overloaded tunnel to the selected gateway node.

19. The non-transitory computer-readable storage medium as recited in claim 15, wherein the plurality of overlay tunnels include Internet Protocol Security (IPSec) tunnels, Generic Routing Encapsulation (GRE) tunnels, Datagram Transport Layer Security (DTLS) tunnels, WireGuard tunnels, Secure Sockets Tunneling Protocol (SSTP) tunnels, Secure Sockets Layer (SSL) tunnels, Transport Layer Security (TLS) tunnel or other tunnel types.

20. The non-transitory computer-readable storage medium as recited in claim 15, wherein the method further comprises:

storing, via a metric collector, the plurality of KPIs in a database, wherein:

the metric collector is configured to apply predefined policies to the plurality of KPIs stored in the database based on an analysis of the load balancer and a storage capacity of the database;

the one or more gateway nodes regularly provide a plurality of real-time KPIs to the metric collector that stores the plurality of real-time KPIs in the database; and the load balancer is configured to dynamically update:

the tunnel load based on the plurality of real-time KPIs, the node load based on the updated tunnel load, and the dynamic routing indicator based on the updated node load and the updated tunnel load.

* * * * *